(12) United States Patent
Sultenfuss et al.

(10) Patent No.: US 9,524,018 B2
(45) Date of Patent: Dec. 20, 2016

(54) ADAPTIVE INTEGRAL BATTERY PACK AND VOLTAGE REGULATOR

(71) Applicant: Dell Products, LP, Round Rock, TX (US)

(72) Inventors: Andrew T. Sultenfuss, Leander, TX (US); Richard C. Thompson, Cedar Park, TX (US)

(73) Assignee: Dell Products, LP, Round Rock, TX (US)

( * ) Notice: Subject to any disclaimer, the term of this patent is extended or adjusted under 35 U.S.C. 154(b) by 274 days.

(21) Appl. No.: 14/015,514

(22) Filed: Aug. 30, 2013

(65) Prior Publication Data

US 2015/0067362 A1 Mar. 5, 2015

(51) Int. Cl.
*G06F 1/26* (2006.01)
*G06F 1/32* (2006.01)
*G06F 1/28* (2006.01)
*G06F 1/30* (2006.01)

(52) U.S. Cl.
CPC .............. *G06F 1/3296* (2013.01); *G06F 1/263* (2013.01); *G06F 1/28* (2013.01); *G06F 1/30* (2013.01); *G06F 1/3212* (2013.01); *Y02B 60/1285* (2013.01); *Y02B 60/1292* (2013.01)

(58) Field of Classification Search
CPC ........................................................ G06F 1/32
USPC ................................................. 713/300, 320
See application file for complete search history.

(56) References Cited

U.S. PATENT DOCUMENTS

| | | | | |
|---|---|---|---|---|
| 3,585,482 A * | 6/1971 | Zelina | ..................... | H02J 7/008 320/125 |
| 5,204,610 A * | 4/1993 | Pierson | ................... | H02J 9/061 307/66 |
| 5,287,053 A * | 2/1994 | Hutchinson | ............. | H02J 9/061 307/66 |
| 6,049,141 A * | 4/2000 | Sieminski et al. | .............. | 307/44 |
| 6,223,025 B1 * | 4/2001 | Tsukuda | .............. | H04W 52/028 340/7.37 |
| 6,501,249 B1 | 12/2002 | Drori | | |
| 7,298,113 B2 * | 11/2007 | Orikasa | ............... | H01M 6/5033 320/103 |
| 7,417,406 B2 * | 8/2008 | Miwa et al. | .................. | 320/151 |
| 7,538,519 B2 | 5/2009 | Daou et al. | | |
| 8,368,359 B2 | 2/2013 | Chen | | |
| 8,370,659 B2 | 2/2013 | Chiasson et al. | | |
| 2004/0225333 A1 * | 11/2004 | Greatbatch | .............. | A61N 1/08 607/34 |
| 2005/0127871 A1 * | 6/2005 | Orikasa | ............... | H01M 6/5033 320/112 |
| 2006/0057447 A1 * | 3/2006 | Yamase et al. | .................. | 429/23 |
| 2009/0045775 A1 | 2/2009 | Popescu et al. | | |
| 2009/0066161 A1 | 3/2009 | Lu et al. | | |

(Continued)

FOREIGN PATENT DOCUMENTS

NZ    WO 2002/080332 A1    10/2002

*Primary Examiner* — Mohammed Rehman
(74) *Attorney, Agent, or Firm* — Larson Newman, LLP

(57) ABSTRACT

An information handling system includes battery packs, loads, and a power management module operable to set an output voltage of a battery pack and direct power from the battery pack to one or more loads. The power management module can direct power from multiple batteries to a load simultaneously. A battery pack includes a converter circuit to convert the voltage provided by battery cells within the battery pack to a voltage set by a power management module.

9 Claims, 17 Drawing Sheets

(56) References Cited

U.S. PATENT DOCUMENTS

| | | | |
|---|---|---|---|
| 2009/0309422 A1* | 12/2009 | Helmick | 307/53 |
| 2010/0250973 A1 | 9/2010 | Breen, III et al. | |
| 2011/0078470 A1* | 3/2011 | Wang et al. | 713/320 |
| 2012/0235823 A1* | 9/2012 | Trock et al. | 340/636.1 |
| 2013/0277309 A1* | 10/2013 | Inoue et al. | 210/650 |
| 2014/0316290 A1* | 10/2014 | Kobayashi | A61B 5/02225 600/490 |

* cited by examiner

ADAPTIVE INTEGRAL BATTERY PACK AND VOLTAGE REGULATOR

FIELD OF THE DISCLOSURE

The present disclosure generally relates to information handling systems, and more particularly relates to batteries and voltage regulators for information handling systems.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, networking systems, and data storage systems.

An information handling system in a particular installation may use one or more batteries as a sole power source or to power the system when other power sources are unavailable. A particular installation may use different configurations of batteries at different times. The information handling system may perform differently depending on the current battery configuration and the state of the particular batteries.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

Figure 1A:
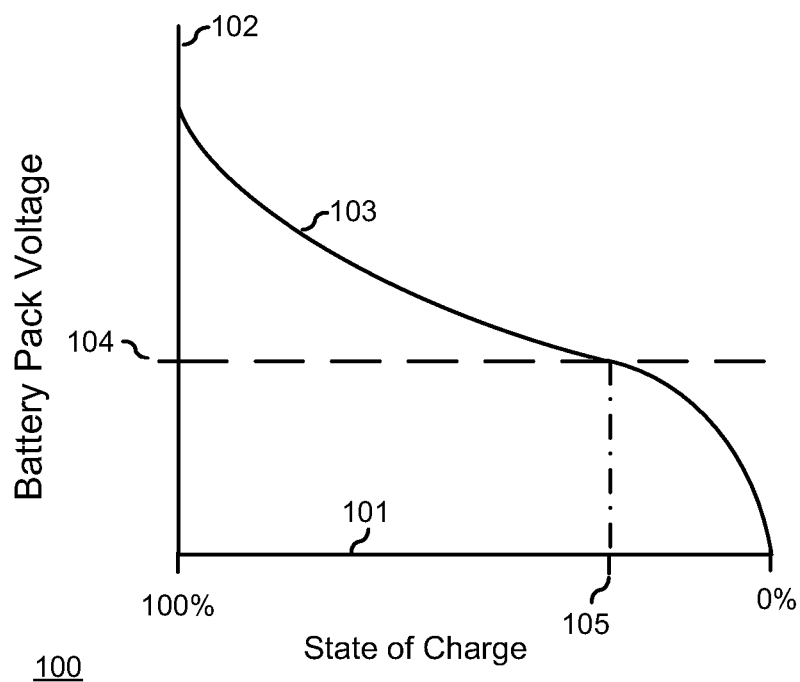
FIGS. 1A, 1B, 2A, and 2B are graphs of voltage and power provided by a battery pack according to an embodiment of the present disclosure.

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings. However, other teachings may be utilized in this application, as well as in other applications and with several different types of architectures such as distributed computing architectures, client or server architectures, or middleware server architectures and associated components.

In a particular embodiment, an information handling system uses battery packs to provide power. Battery power can be the sole power source for a system, or it can augment other power sources. For example, a battery pack can provide backup power to allow an orderly shutdown of a system in the event that line power is lost. In a particular information handling system it can be advantageous to use more than one battery pack to power the system. A laptop computer system can have an internal battery pack allowing a relatively short period of operation. A battery pack storing additional power can be attached to the laptop computer to allow a longer period of operation. An additional battery pack can also provide enough power to allow the computer to use a high performance mode of operation.

For purposes of this disclosure, an information handling system can include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

The term "battery pack" as used herein describes a device that includes battery cells and can include additional circuits or modules. A battery pack can include an assembly of any number of Li-ion or Li-ion polymer cells, associated electronics, battery packaging, and connector(s). Additional circuits or modules contained in a battery pack in a particular embodiment are clearly noted in the description of the embodiment. In various embodiments, a plurality of cells in a battery pack can be configured in a serial topology, a parallel topology, or a combination thereof. In an embodiment, a battery pack can include a battery management unit. Charging the battery cells in a battery pack may be referred to herein as "charging the battery pack." A battery pack can include a single cell or it can include multiple cells. The terms "cells" or "battery cells" in the plural as used herein in conjunction with a battery pack encompasses both a single cell and multiple cells.

The term "adaptive battery pack" as used herein describes a battery pack that includes circuitry to perform DC-DC voltage conversion on current flowing into or out of the battery pack and the battery cells within the pack. In embodiment, a DC-DC converter can be incorporated into a battery pack. In another embodiment, a DC-DC converter can be located outside of the physical enclosure of a battery pack. The DC-DC conversion can alter the voltage supplied to an electrical load by the battery cells as described herein. The DC-DC conversion can also alter the voltage of a current supplied at a terminal of the battery pack to the battery cells as described herein.

FIG. 1A shows a graph 100 of a relationship between an output voltage of a battery pack lacking a DC-DC converter in an information handling system and the state of charge of the battery pack. The horizontal axis 101 represents the state of charge of the battery pack, from 100% to 0%. The vertical axis 102 represents the voltage provided by the battery pack. In an embodiment, a battery pack used in an information handling system does not provide a constant voltage as the state of charge of the battery pack declines from 100%. As illustrated by voltage curve 103, the voltage provided by a battery pack declines as the battery pack is discharged. For example, the voltage of the battery pack can be 4V when the battery pack is 100% charged and can decline to 3V when the battery pack is at 0% charge. In an embodiment, the operation of an information handling system coupled to the battery pack can depend on power rather than on voltage alone. For example, a high performance mode of operation of an information handling system can require that a battery pack provide a relatively high level of power. As the output voltage of the battery pack declines, the battery pack provides an increasing current in order to maintain the power level required to operate the information handling system in the high performance mode.

Due to limitations of a battery pack, or to the limitations of another component of an information handling system, the battery pack can be limited in the level of current that it is able to provide to the information handling system regardless of the output voltage of the battery pack. For example, the battery pack can have an internal impedance that restricts the current that can be output by the pack. Once the maximum current level is reached, the declining output voltage of the battery pack results in reduced power provided to the information handling system. Voltage level 104 indicates the voltage at which the battery pack can no longer provide increasing current to the information handling system as the output voltage level declines. Thus, at output voltage levels less than voltage level 104 the peak power provided by the battery pack will be reduced. Voltage level 104 corresponds to the state of charge 105. In an embodiment, reduced peak power provided by a battery pack prevents an information handling system from operating in a high performance mode, and the information handling system operates in a lower performance mode consuming less power.

Figure 1B:
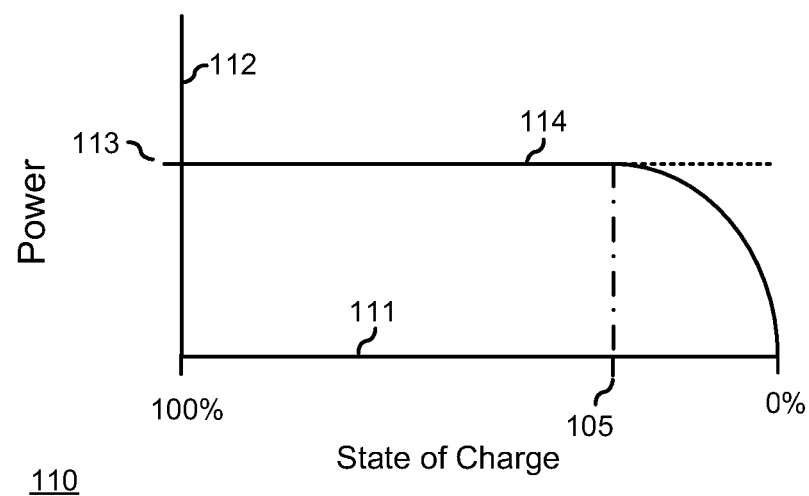

FIG. 1B shows a graph 110 of power provided to an information handling system by a battery pack lacking a DC-DC converter. The horizontal axis 111 represents the state of charge of the battery pack, from 100% to 0%. The vertical axis 112 represents the power provided by the battery pack. Power level 113 represents the power consumed by an information handling system in a particular mode of operation. As illustrated by power curve 114, the power provided by the battery pack remains constant at power level 113 until the battery pack reaches state of charge 105. As discussed with respect to FIG. 1A, at state of charge 105 the voltage of the battery pack continues to decline, but the current provided by the battery pack can no longer increase. Thus, the power provided by the battery pack declines as the battery pack is discharged further than state of charge 105.

Figure 2A:
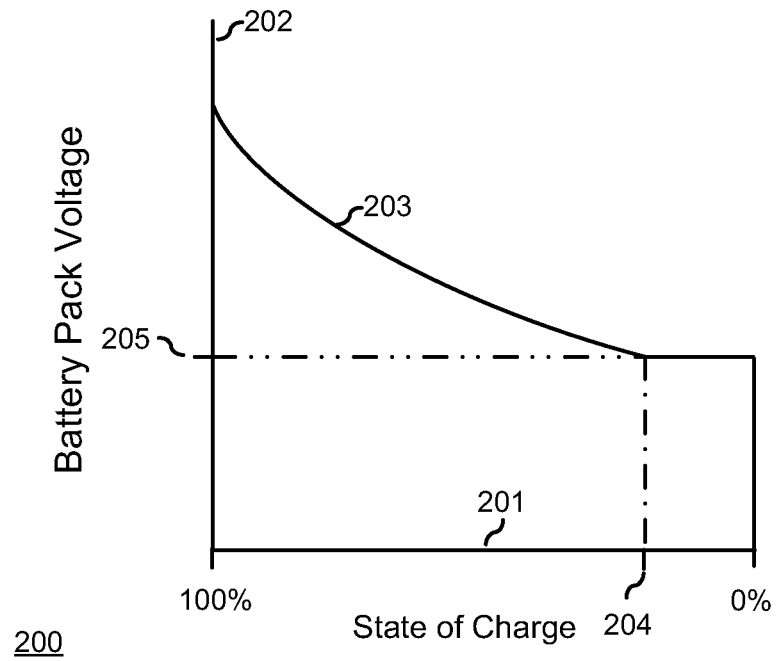

FIG. 2A shows a graph 200 of a relationship between an output voltage of an adaptive battery pack using a DC-DC converter in an information handling system and the state of charge of the adaptive battery pack. The horizontal axis 201 represents the state of charge of the adaptive battery pack, from 100% to 0%. The vertical axis 202 represents the voltage provided by the adaptive battery pack. In an embodiment, an adaptive battery pack used in an information handling system does not provide a constant voltage as the state of charge of the adaptive battery pack declines from 100%. The voltage output by the adaptive battery pack is a function of the state of charge of the adaptive battery pack, as illustrated by voltage curve 203. The voltage declines as state of charge declines until charge level 204 is reached. The voltage output by the adaptive battery pack at charge level 204 is indicated by voltage level 205. As the adaptive battery pack discharges to levels less than charge level 204, the adaptive battery pack employs a DC-DC converter to boost the output voltage to voltage level 205. Although the output voltage of the adaptive battery pack can remain constant as a result of the operation of the DC-DC converter, the voltage provided by battery cells within the adaptive battery pack continues to decline as the cells discharge. As discussed with respect to FIGS. 1A and 1B current provided by the battery cells cannot increase, therefore power provided by the adaptive battery pack can decline.

Figure 2B:
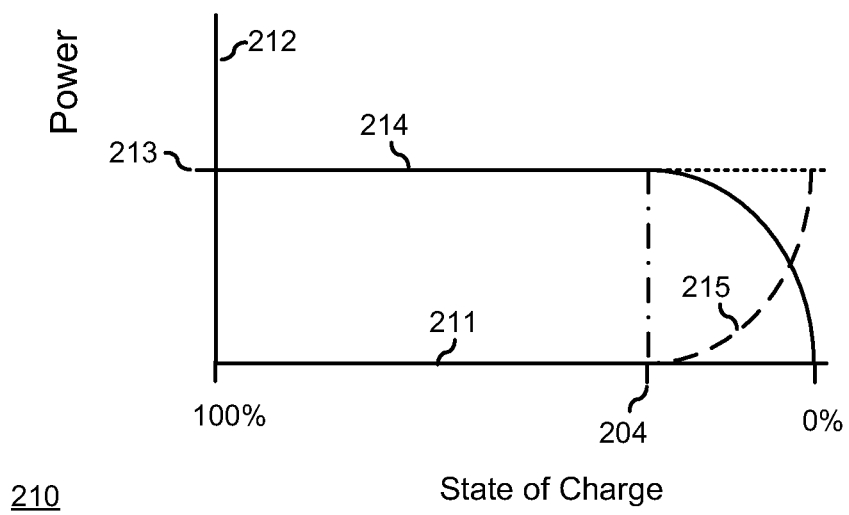

FIG. 2B shows a graph 210 of power provided by two adaptive battery packs in an information handling system. The horizontal axis 211 represents the state of charge of a first adaptive battery pack, from 100% to 0%. The vertical axis 212 represents the power provided to the electrical load by the adaptive battery packs. The electrical load consumes power at power level 213. The first adaptive battery pack provides power to the electrical load at power level 213 beginning at a charge level of 100% until the charge level of the first adaptive battery pack reaches charge level 204. As described with respect to FIG. 2A, the output voltage of the first adaptive battery pack is voltage 205. As the charge level of the first adaptive battery pack declines to less than charge level 204 the power that the first adaptive battery pack can provide declines, as indicated by power curve 214. In response to the first adaptive battery pack reaching charge level 204, the information handling system configures the first adaptive battery pack to provide power to the electrical load at voltage level 205, and configures the second adaptive battery pack to also provide power to the electrical load at voltage level 205. As the power provided by the first adaptive battery pack declines, as indicated by power curve 214, the power provided by the second adaptive battery pack increases as indicated by power curve 215. The sum of the power provided by the first adaptive battery pack and the second adaptive battery pack is power level 213.

Figure 3:
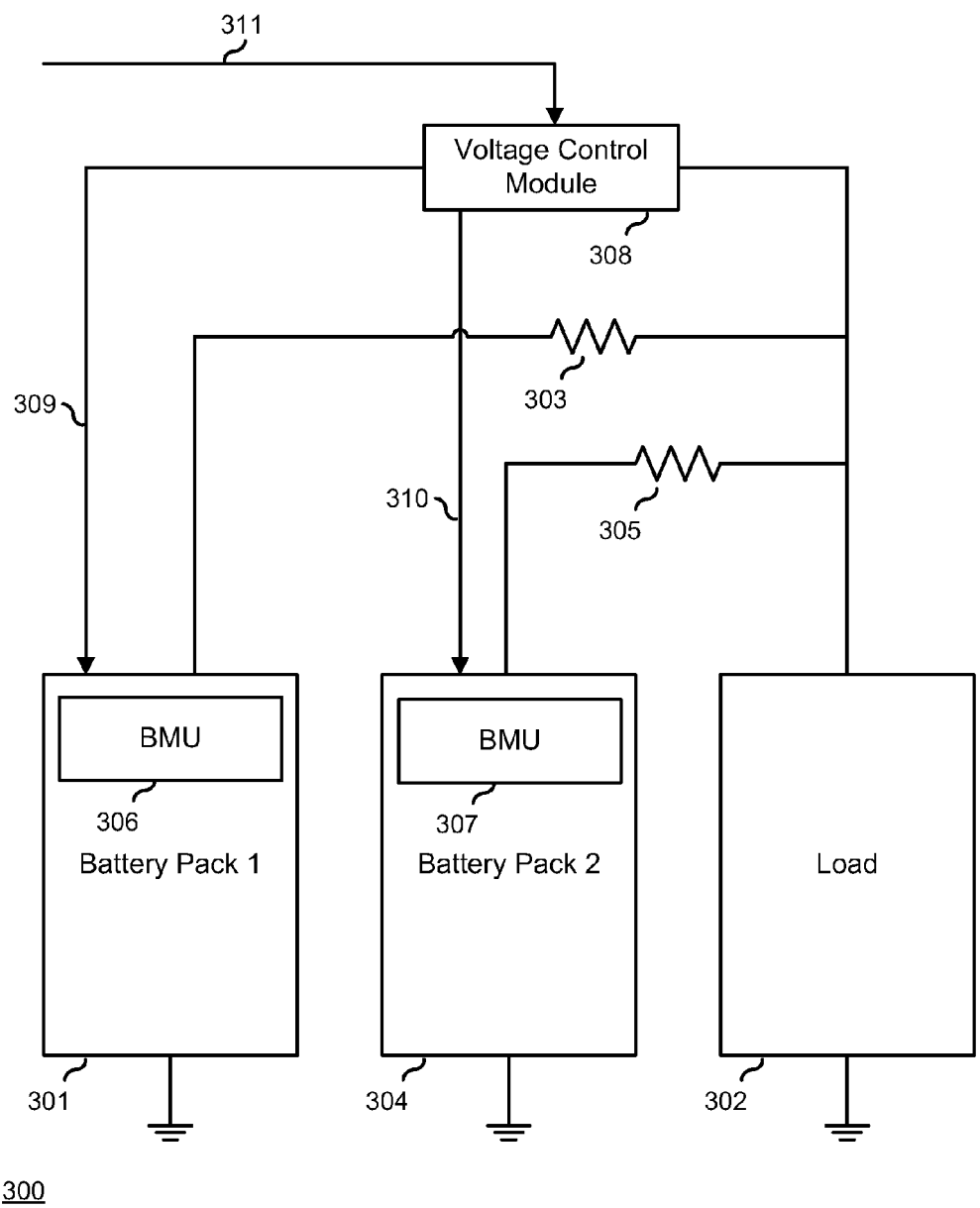
FIG. 3 is a block diagram of an information handling system having two adaptive battery packs according to an embodiment of the present disclosure.

FIG. 3 shows a block diagram of an information handling system 300 using two adaptive battery packs 301 and 304 to simultaneously power an electrical load 302. Battery pack 301 is connected to load 302 through resistor 303. Battery pack 304 is connected to load 302 through resistor 305. Resistors 303 and 305 represent voltage drops in the information handling system that result in the voltage applied to the load 302 being lower than the outputs voltages of adaptive battery packs 301 and 304. Adaptive battery packs 301 and 304 each contain one or more cells (not shown). The cells within a particular adaptive battery pack 301 or 304 can be connected in one of various parallel and series configurations. For example, four cells can be connected in a two series/two parallel configuration having two pairs of series connected cells with the pairs connected in parallel. The output voltage of an adaptive battery pack 301 or 304 is in part determined by the configuration of cells within the pack. In an embodiment, adaptive battery packs 301 and 304 use different cell configurations. In addition to having a particular configuration, the cells within an adaptive battery pack 301 or 304 have a particular chemistry for producing electrical current. Nickel metal hydride (NiMH) and lithium ion (Li-ion) are examples of chemistries used for rechargeable battery packs. In an embodiment, the cells contained in adaptive battery packs 301 and 304 use different cell chemistries.

Adaptive battery packs 301 and 304 include battery management units (BMU) 306 and 307 respectively. Each of battery management units 306 and 307 includes an adjustable DC-DC voltage converter capable of increasing or decreasing the voltage provided by the cells within adaptive battery packs 301 and 304, respectively, in response to control signals 309 and 310. Thus, the output voltage of each adaptive battery pack 301 and 304 can be individually controlled. The control signals 309 and 310 are provided by voltage control module 308. The output voltages of adaptive battery packs 301 and 304 are adjusted so that both adaptive battery packs provide power to load 302. In an embodiment, the output voltages of adaptive battery packs 301 and 304 are adjusted based on a desired operating mode of electrical load 302. DC-DC conversion techniques well known in the art, for example a buck-boost converter, can be used to increase or to decrease the voltage provided by the cells. In an embodiment, the DC-DC voltage converter only decreases the voltage provided by the cells. In another embodiment, the DC-DC converter only increases the voltage provided by the cells.

In an embodiment, a voltage control module 308 senses the current drawn by an electrical load and provides a control signal to battery control modules of battery packs based on the current drawn by the electrical load. It may be advantageous, for example, to provide a higher input voltage to the electrical load in order to minimize the power dissipated by losses incurred in transmitting current from the battery packs to the electrical load. In another embodiment, voltage control module 308 provides control signals 309 and 310 in response to voltage set signal 311. Voltage set signal 311 instructs voltage control module 308 to control battery packs 301 and 304 to produce a particular voltage at load 302. For example, the particular voltage level can allow the load 302 to operate in a desired mode of operation. In an embodiment, the particular voltage level indicated by voltage set signal 311 is higher than the voltage output by cells within battery packs 301 and 304. The battery management units 306 and 307 boost the voltage output by the cells to the voltage indicated by voltage set signal 311.

Figure 4:
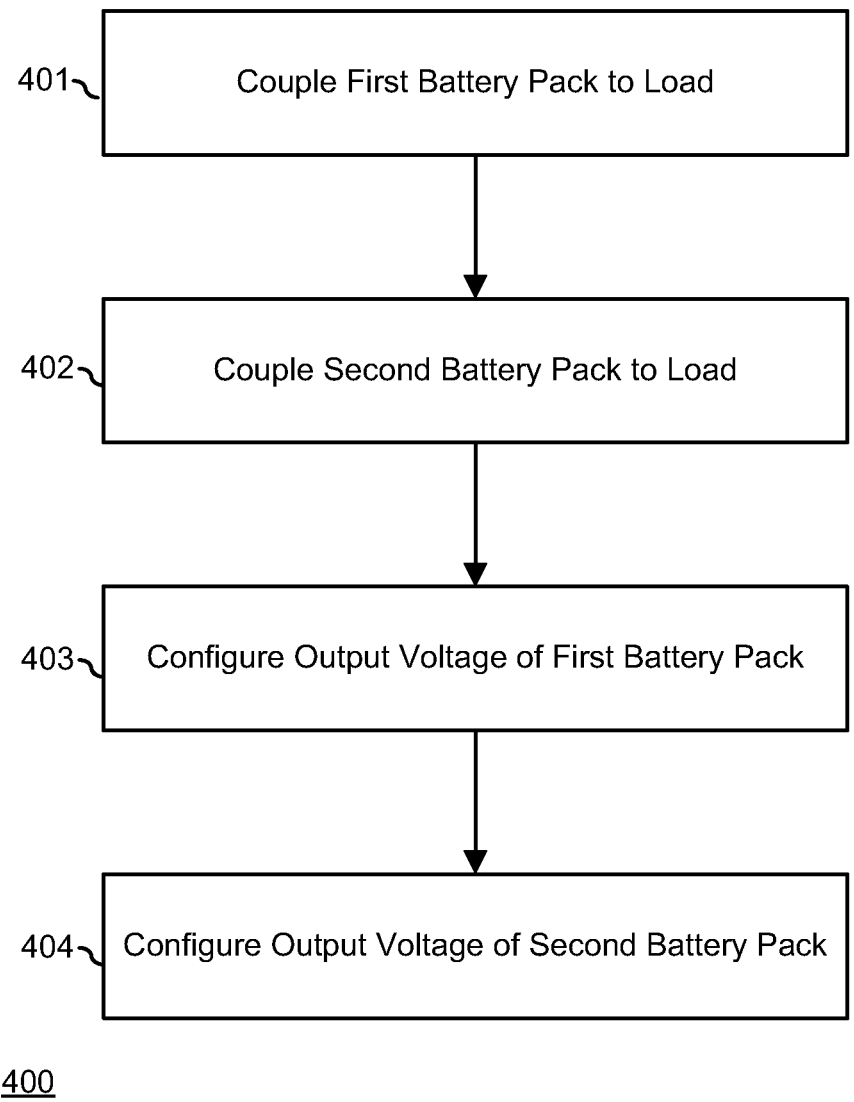
FIG. 4 is a flow diagram of a method for operating adaptive battery packs according to an embodiment of the present disclosure.

FIG. 4 shows a flow diagram 400 of a method for operating adaptive battery packs in an information handling system. At step 401a first adaptive battery pack is coupled to an electrical load. In an embodiment, the first adaptive battery pack is a battery pack permanently connected to an information handling system. In an embodiment, the first adaptive battery pack is a removable battery pack. At step 402, a second adaptive battery pack is connected to the electrical load. In an embodiment, the second adaptive battery pack is an auxiliary battery pack attached to an information handling system. At step 403, the output voltage of the first adaptive battery pack is configured. At step 404, the output voltage of the second adaptive battery pack is configured. The voltages of both the first adaptive battery pack and the second adaptive battery pack are configured to the same voltage. In an embodiment, the voltages of the adaptive battery packs are adjusted to a predetermined reference value. In an embodiment, the voltages of the adaptive battery packs are configured to a value based upon a characteristic of the electrical load. In an embodiment, the characteristic of the electrical load is an operating mode of the information handling system.

Figure 5:
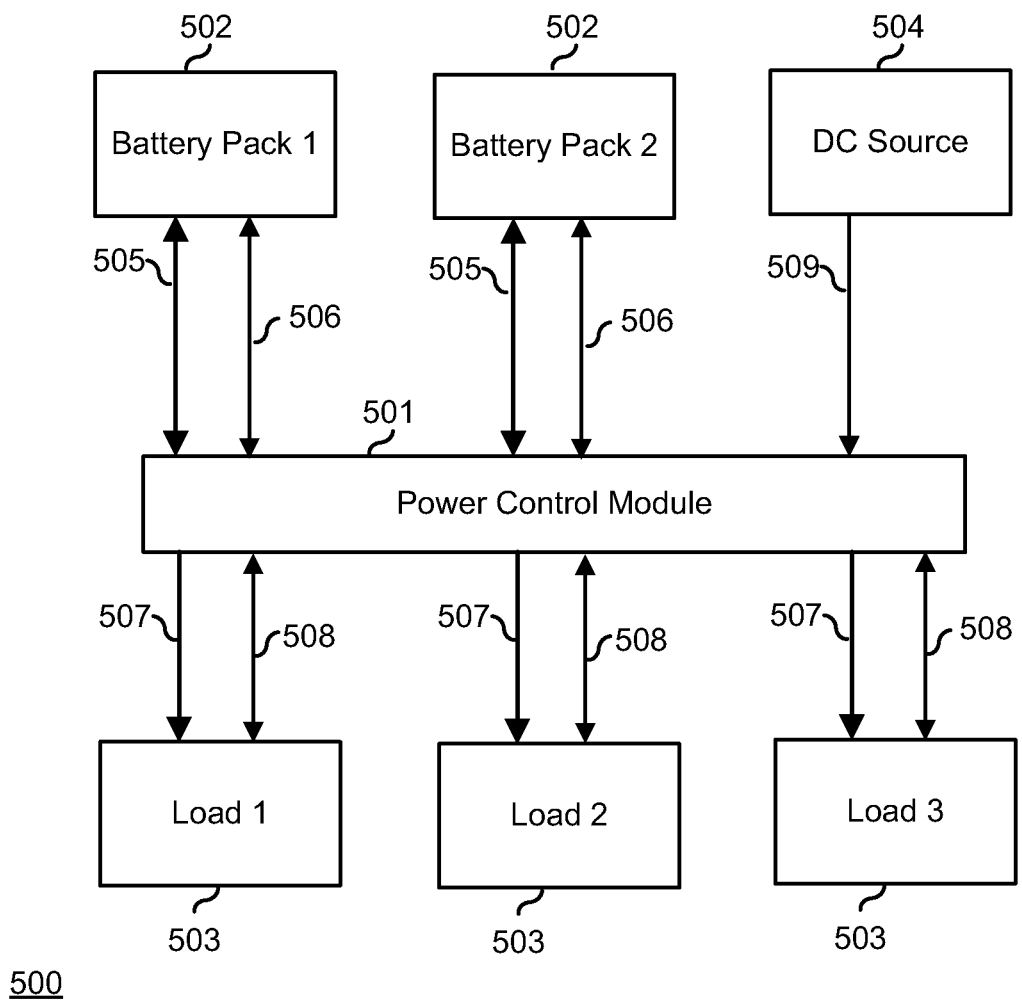
FIG. 5 is a block diagram of an information handling system including a power control module according to an embodiment of the present disclosure.

FIG. 5 shows a block diagram of an information handling system 500. Information handling system 500 includes a power control module 501, adaptive battery packs 502, loads 503 and DC source 504. Adaptive battery packs 502 include battery cells and a battery control module incorporating a DC-DC converter as described with respect to FIG. 3. Adaptive battery packs 502 are coupled to power control module 501 through power connections 505. Adaptive battery packs 502 can discharge through power connections to 505 to provide power to loads 503. Adaptive battery packs 502 can charge through power connections 505 when provided with DC power through power control module 501. Power control module 501 provides control information to adaptive battery packs 502 through communication signal 506. In an embodiment, power control module 501 controls the output voltages of adaptive battery packs 502 through communication signal 506. In a particular embodiment, communication signal 506 operates in accordance with a System Management Bus (SMBus) protocol for sending and receiving data. Adaptive battery packs 502 can provide information about themselves to power control module 501 using communication signal 506. For example, an adaptive battery pack 502 can inform power control module 501 of the cell configuration and chemistry of battery cells within the pack. Communication signal 506 can also provide alert information from adaptive battery packs 502 to power control module 501 to inform the information handling system of various alert conditions within adaptive battery packs 502. Examples of alert conditions include battery charge full, battery charge empty, battery charging, battery discharging, battery over temperature, over current, another battery system status, or a combination thereof.

In an embodiment, adaptive battery packs 502 have different battery cell configurations, as described with respect to FIG. 3. In an embodiment, adaptive battery packs 502 are housed within the same physical module of an information handling system. Examples of physical modules of an information handling system include display units, keyboard units, and battery units. For example, two adaptive battery packs 502 can be housed within the keyboard unit of a laptop computer. In an embodiment, adaptive battery packs 502 are housed in different physical modules of an information handling system. For example, an adaptive battery pack 502 can be housed in a display unit, such as a tablet computer, and a second adaptive battery pack 502 can be housed in a keyboard unit which can be attached to and detached from the tablet computer. In another example, an adaptive battery pack can be housed in a battery unit that can be attached to a laptop computer having an internal battery pack. In an embodiment, the adaptive battery pack 502 of one physical module can be used to provide power to a load 502 located in another physical module. For example, an adaptive battery pack in a keyboard unit can provide power to a display in a display unit. In an embodiment, the physical modules containing adaptive battery packs can be separated and a physical module can be operated using only the battery packs contained within the physical module.

Loads 503 are coupled to power control module 501 through power connections 507 and communication signal 508. Power connections 506 provide power to the loads 503 from one or more of adaptive battery packs 502 and DC source 504. Loads 503 can include different types of modules within an information handling system. For example, a first load 503 can include a CPU of the information handling system and a second load 503 can include a backlight for a display. Loads 503 can operate in a plurality of modes, with each mode having a different power requirement. For example, a load 503 including a CPU can consume relatively higher power when operating in a high performance mode and can consume relatively lower power when operating in a low performance mode. Loads 503 can change modes of operation rapidly. For example, a load 503 including a CPU can operate in a low power mode consuming relatively low power, switch to a high performance mode consuming higher power to process a packet received on a communication network, and switch back to a low performance mode after processing the packet. In another embodiment, a load 503 can change modes of operation relatively slowly. For example, a backlight can consume relatively higher power while a user is active and transition to a mode of operation consuming less power after a period of user inactivity. In an embodiment, a load 503 can indicate a desired power level to power control module 501 through communication signal 508.

Power control module 501 controls the flow of power from adaptive battery packs 502 and DC source 504 to loads 503. Power control module 501 can direct power from any one of adaptive battery packs 502 or DC source 504 to one or more of loads 503. In an embodiment, power control module 501 can direct power from a first adaptive battery pack 502 to a first load 503 and, simultaneously, can direct power from a second adaptive battery pack 502 to a second load 503. In an embodiment, power control module 501 instructs an adaptive battery pack 502 to provide a particular voltage suitable for a load 503. In an embodiment, the particular voltage is based on the operating mode of the load 503. In an embodiment, the particular voltage is selected by power control module 501 based on a system performance parameter of an information handling system. Examples of system performance parameters include battery life and power transmission losses. In an embodiment, power control module 501 instructs an adaptive battery pack 502 to provide a voltage lower than the battery cells of battery pack 502 to operate a load 503 with greater efficiency. For example, power control module 501 can instruct an adaptive battery pack 502 to provide a lower voltage to a load 503 that is a CPU when the CPU is in a sleep state. In the sleep state, the CPU can consume less power at a lower voltage than in an operating state. In an embodiment, power control module 501 in an information handling system can select one of adaptive battery packs 502 to power a load 503 based on a state of the information handling system. For example, when a load 503 is in a standby mode consuming relatively little power, power control module 501 can select an adaptive battery pack 502 having a low power capacity. In an embodiment, in response to the information handling system exiting the standby mode and entering an operating mode, power control module 501 can select another adaptive battery pack 502 having a higher power capacity.

In an embodiment, power control module 501 instructs a first adaptive battery pack 502 to provide a reference voltage and instructs a second adaptive battery pack 502 to provide the reference voltage. Power control module 501 directs power from the first adaptive battery pack 502 and from the second adaptive battery pack 502 to the same load 503 simultaneously. In an embodiment, power control module 501 can simultaneously direct power from a plurality of adaptive battery packs 502 to a plurality of loads 503.

DC source 504 provides power to the information handling system through power connection 509 and power control module 501. In an embodiment, DC source 504 provides power to all loads 503 in the information handling system. In an embodiment, DC source 504 provides power to a subset of the loads 503. DC source 504 also provides power to charge adaptive battery packs 502 through power connection 509 and power control module 501. In an embodiment, power control module 501 simultaneously directs power from DC source 504 to an adaptive battery pack 502 and to a load 503. In an embodiment, power control module 501 simultaneously directs power from DC source 504 to a first adaptive battery pack 502 and to a second adaptive battery pack 502. As described herein, the adaptive battery packs 502 include DC-DC converters to convert the voltage provided by DC source 504 to voltages suitable for use in charging battery cells within the respective adaptive battery packs 502. In an embodiment, DC source 504 can be detached from the information handling system. For example, DC source 504 can be an AC adaptor used with a laptop computer.

Figure 6:
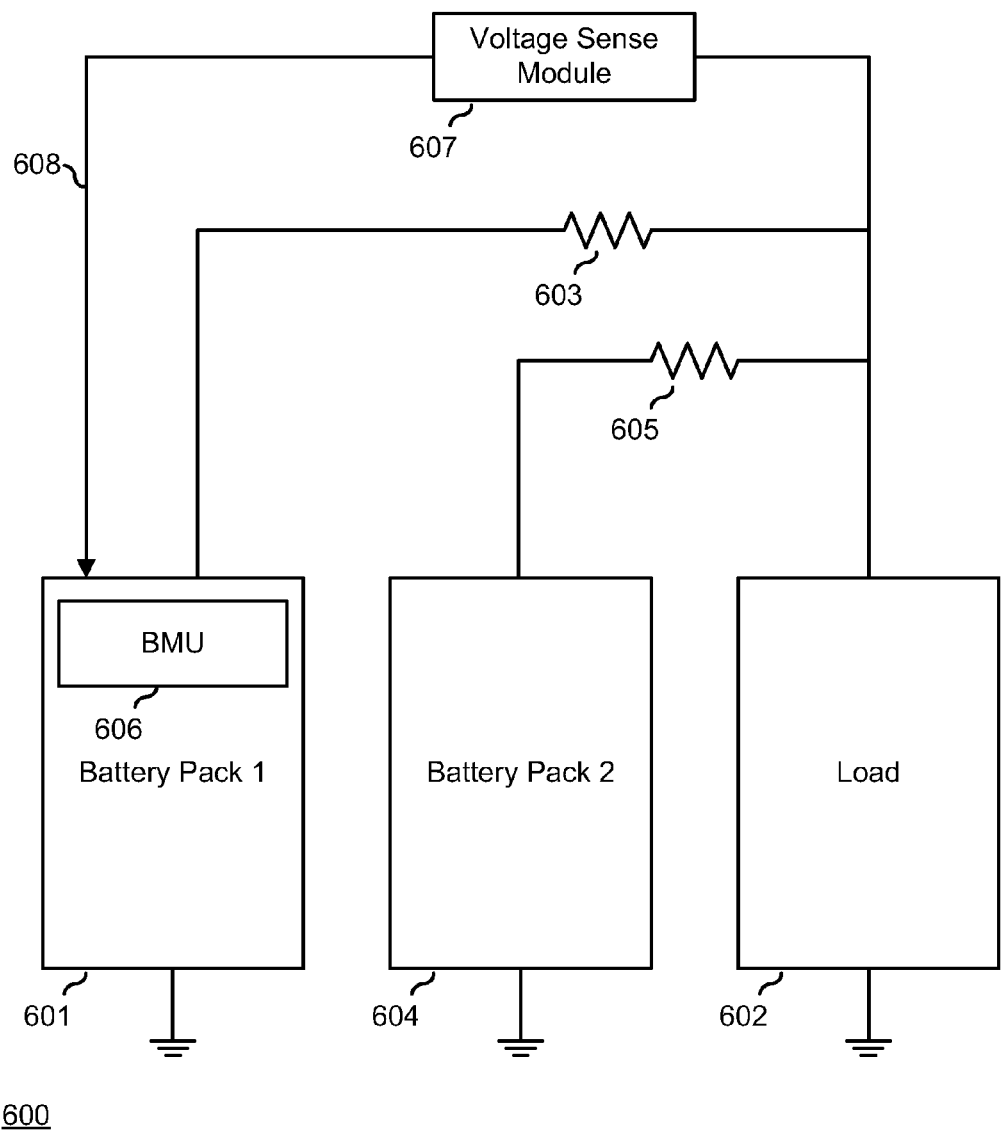
FIG. 6 is a block diagram of an information handling system having one adaptive battery pack and one non-adaptive battery pack according to an embodiment of the present disclosure.

FIG. 6 shows an embodiment of an information handling system 600 using adaptive battery pack 601 and battery pack 604 to simultaneously power an electrical load 602. Adaptive battery pack 601 is connected to load 602 through resistor 603. Battery pack 604 is connected to load 602 through resistor 605. Resistors 603 and 605 represent voltage drops in the information handling system that result in the voltage applied to the load 602 being lower than the output voltages of adaptive battery pack 601 and battery pack 604. Such voltage drops can be due to connectors or to the resistance of the cables carrying current from adaptive battery pack 601 and from battery pack 604 to the load 602. The voltage presented at the load 602 is determined by the voltage at the output of the battery pack 604. The output voltage of battery pack 604 is in turn dependent on the state of charge of the battery pack 604, and on the losses between the battery pack 604 and the load 602. Adaptive battery pack 601 and battery pack 604 each contain one or more cells (not shown). Similar to battery packs 301 and 304, adaptive battery pack 601 and battery pack 604 each contain one or more cells using various chemistries and in various configurations. In embodiments of the present disclosure, each of adaptive battery pack 601 and battery pack 604 can have the same or different cell configurations and chemistries.

Adaptive battery pack 601 includes a battery management unit 606. Battery management unit 606 includes an adjustable DC-DC voltage converter capable of increasing or decreasing the voltage provided by the cells within the adaptive battery pack 601 in response to a control signal 608. DC-DC conversion techniques well known in the art, for example a buck-boost converter, can be used to increase or to decrease the voltage provided by the cells. In an embodiment, the DC-DC voltage converter only decreases the voltage provided by the cells. In another embodiment, the DC-DC converter only increases the voltage provided by the cells.

The load 602 represents one or more devices or modules of the information handling system 600. In an embodiment, load 602 is a processor. In another embodiment, load 602 is a regulator that converts a voltage supplied by adaptive battery pack 601 and by battery pack 604 to one or more other voltages required to operate the information handling system 600.

The control signal 608 to battery management unit 606 is provided by voltage sense module 607. Voltage sense module 607 senses the voltage at the load 602 and provides the control signal 608 to battery management unit 606 based on the sensed voltage at the load 602. In an embodiment, voltage sense module 607 includes a voltage follower circuit. In an embodiment, voltage sense module 607 includes an analog to digital converter and presents a digital indication of the voltage at the load 602 to battery management unit 606. In an embodiment, the control signal 608 from voltage sense module 607 to battery management unit 606 is implemented using a system management bus, for example an SMBus connection. In an embodiment, voltage sense module 607 is incorporated into adaptive battery pack 601.

In an embodiment, not shown, a voltage sense module senses the output voltage of a battery pack rather than the voltage at a load. In an embodiment, the voltage sense module is incorporated into the battery pack. In a particular design for an information handling system the electrical losses between the battery pack and the load are known, such that the output voltage required at the load is calculated using only the information available at the battery pack.

The information handling system 600 operates by having the voltage output by adaptive battery pack 601 adjusted according to control signal 608 by battery management unit 606 such that the output voltage of adaptive battery pack 601 provides the same voltage at the load 602 as does battery pack 604. Battery pack 604 lacks a DC-DC converter. The output voltage of battery pack 604 declines as the cells within the pack discharge as discussed with respect to FIG. 1A.

Figure 7:
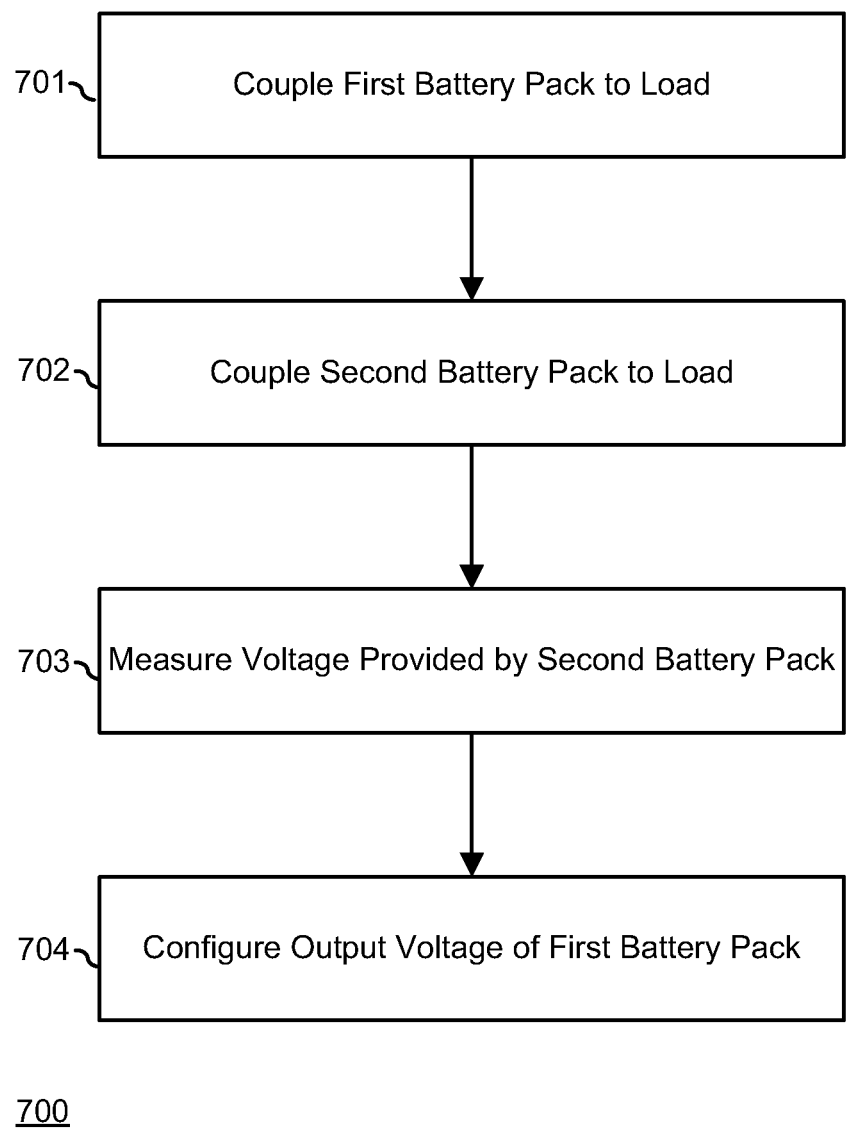
FIG. 7 is a flow diagram of a method for operating an adaptive battery pack according to an embodiment of the present disclosure.

FIG. 7 shows a flow diagram 700 of a method for operating battery packs in an information handling system. At step 701a first battery pack is coupled to an electrical load. In an embodiment, the first battery pack is a battery pack permanently connected to an information handling system. In an embodiment, the first battery pack is a removable battery. At step 702, a second battery pack is connected to the electrical load. In an embodiment, the second battery pack is an auxiliary battery pack attached to an information handling system. At step 703, the voltage provided at the load by the second battery pack is measured. At step 704, the output voltage of the first battery pack is configured. In an embodiment, the voltage of the first battery pack is configured to match the output voltage of the second battery pack. In an embodiment, the output voltage of the second battery pack is also adjusted. The voltages of both the first battery pack and the second battery pack are adjusted to the same voltage.

Figure 8:
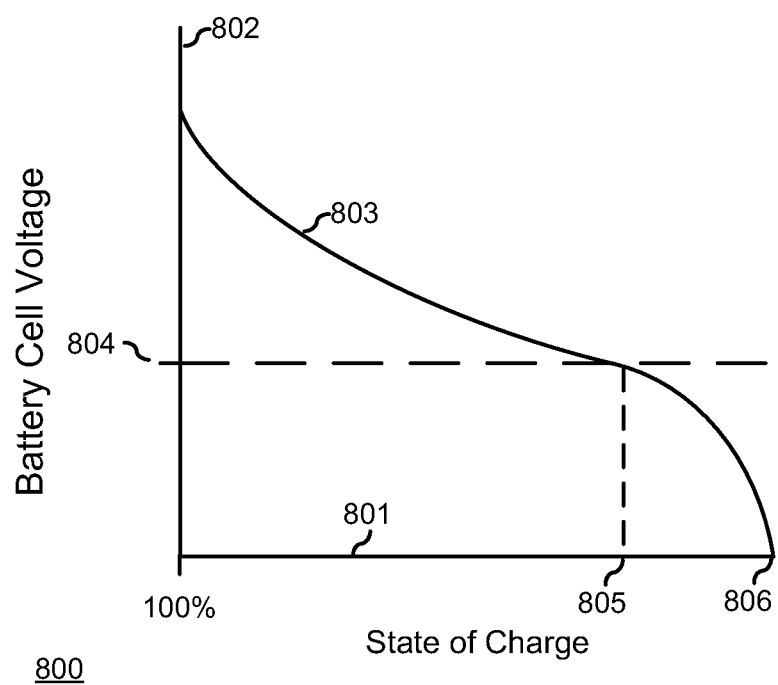
FIG. 8 is a graph of voltage provided by an adaptive battery pack according to an embodiment of the present disclosure.

FIG. 8 shows a graph 800 of a relationship between the voltage of battery cells of a battery pack in an information handling system to state of charge of the battery cells. The horizontal axis 801 represents the state of charge of the battery cells, from 100% to 0%. The vertical axis 802 represents the voltage provided by the battery cells within the battery pack. As illustrated by voltage curve 803, the voltage provided by the battery cells in a battery pack declines as the battery pack is discharged as discussed with respect to FIG. 1A. Voltage level 804 is a preferred voltage in the information handling system. In an embodiment, voltage level 804 can be a high voltage chosen to minimize losses in transmitting power from the battery pack to an electrical load. In an embodiment, voltage level 804 can be a voltage level chosen in response to an operating mode of the information handling system. A battery pack lacking a DC-DC converter provides an output voltage that declines as the battery is discharged. An adaptive battery pack incorporating a DC-DC converter can increase or decrease the voltage provided by battery cells to provide voltage level 804 as the output voltage of the adaptive battery pack. In an embodiment, the output voltage of the adaptive battery pack can be maintained at voltage level 804 at any state of charge of the battery pack between 0% and 100%. In an embodiment, an adaptive battery pack can provide voltage level 804 for states of charge ranging from 100% to state of charge 805. At states of charge between state of charge 805 and state of charge 806 an adaptive battery pack uses a DC-DC converter circuit to provide an output voltage at voltage level 804.

Figure 9:
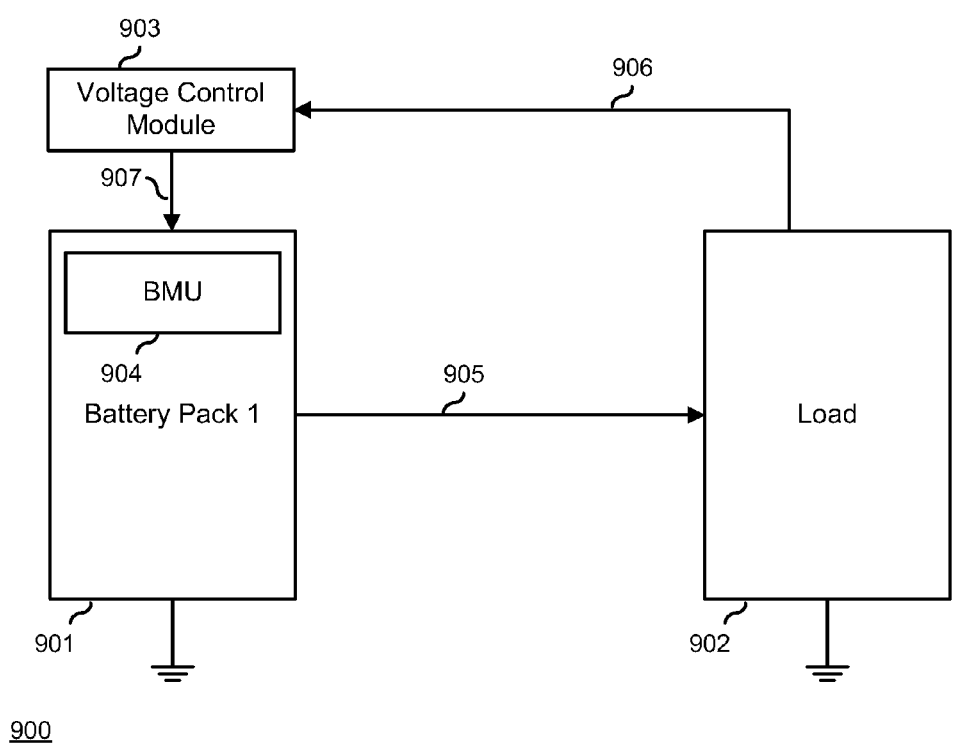
FIG. 9 is a block diagram of an information handling system including an adaptive battery pack according to an embodiment of the present disclosure.

FIG. 9 shows information handling system 900. Information handling system 900 includes adaptive battery pack 901, load 902 and voltage control module 903. Adaptive battery pack 901 includes battery management unit 904. Adaptive battery pack 901 provides electrical power 905 to load 902 at an output voltage controlled by battery management unit 904. Load 902 provides load state information 906 to voltage control module 903. In an embodiment, load state information 906 is based on the operating mode of the load 902. In an embodiment, load state information is based on a desired future operating mode of the load 902. Voltage control module 903 determines a voltage level based on load state information 906, and provides voltage control information 907 based on the determined voltage level to adaptive battery pack 901. In an embodiment, voltage control information 907 specifies the output voltage level of adaptive battery pack 901. In an embodiment, voltage control information 907 indicates a preferred voltage range for the output voltage level of adaptive battery pack 901. In an embodiment, voltage control information 907 indicates that the output voltage level of adaptive battery pack 901 should be increased or should be decreased.

In an embodiment, in addition to using battery packs as a source of power an information handling system provides the capability to charge internal battery packs and external battery packs from a source of DC power. Battery cells of a rechargeable battery pack used in an information handling system can have a set of charging requirements that include a charging voltage and a charging current. The charging voltage requirement and charging current requirement for a particular battery pack can change as the state of charge of the battery cells within the pack change. In an embodiment, the requirements change depending on a particular charging mode. For example, a rechargeable battery pack can have a constant current mode of charging and a constant voltage mode of charging. In an embodiment, charging requirements depend on several factors, including the cell configuration of the battery pack, the chemistry of the cells and the state of charge of the battery pack. In an embodiment, an information handling system which includes battery packs with more than one set of charging requirements provides circuitry capable of meeting the requirements of each battery pack that the information handling system will charge. For example, the information handling system can provide a single charging circuit with an adjustable voltage and current output. In an embodiment, the charging circuit is adjusted to meet the charging requirements of one battery pack at a time. For example, a first battery pack can be charged for a period of time, the charging circuit can be adjusted to the requirements of a second battery, and the second battery pack can be charged.

Figure 10:
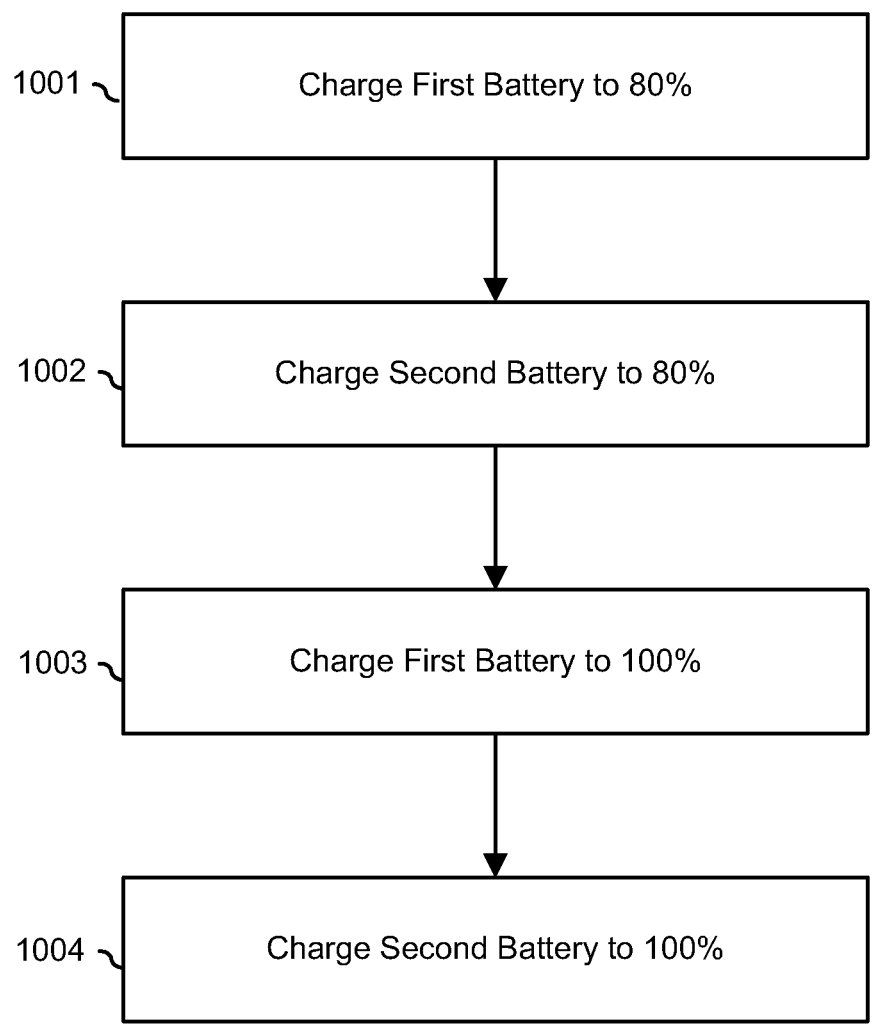
FIG. 10 is a flow diagram of a method for charging two battery packs according to an embodiment of the present disclosure.

FIG. 10 is a flow diagram 1000 illustrating a method for charging two battery packs in an information handling system. The battery packs of the present example are charged at a high rate to a particular level of charge, then charged at a lower rate until they reach full charge. The method includes charging each battery pack in two steps. During the first step, a battery pack is charged to 80% of full charge. During the second step, the battery pack is charged to full charge. At step 1001, the first battery pack is charged to 80% of full charge. At step 1002, the second battery pack is charged to 80% of full charge. At step 1003, the first battery pack is charged to full charge. At step 1004, the second battery pack is charged to full charge.

Figure 11:
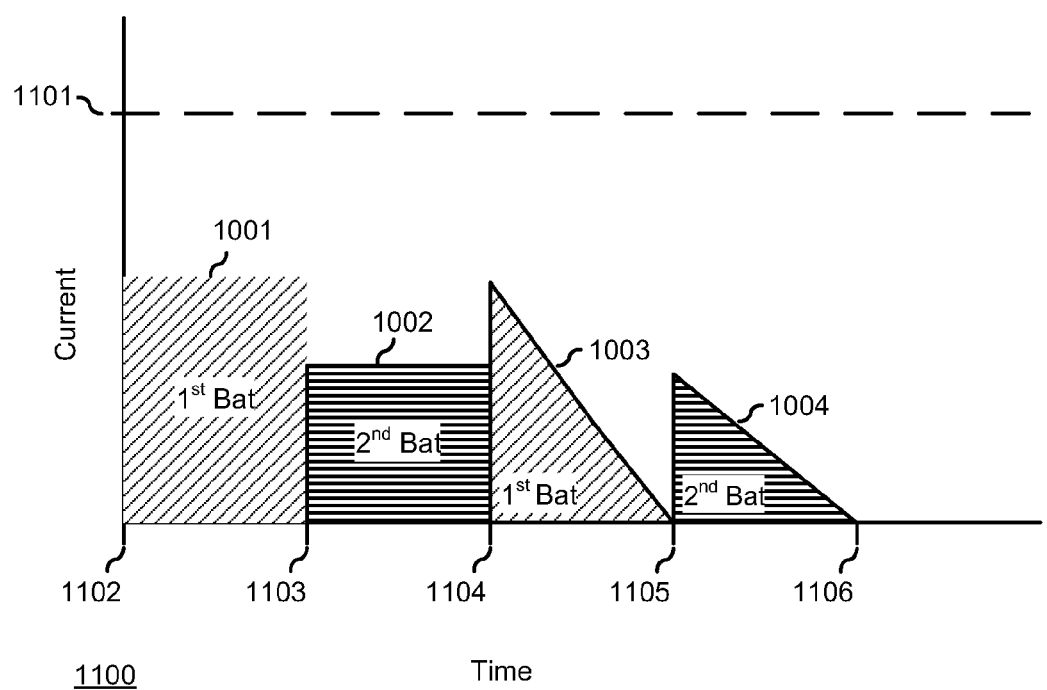
FIGS. 11 and 12 are graphs illustrating the charging of battery packs according to an embodiment of the present disclosure.

FIG. 11 shows a graph 1100 illustrating an example of the current provided by a charging circuit charging a first battery pack and a second battery pack in an information handling system using the method of FIG. 10. The vertical axis of the graph indicates the current provided by the charging circuit. Current level 1101 indicates the maximum current that the charging circuit is capable of providing. In embodiment, current level 1101 is the maximum current limit of a DC source. In an embodiment, the DC source is an AC-DC adapter. The horizontal axis represents time. The shading of areas indicates the particular battery pack to which current is provided. Those skilled in the art will appreciate that the current levels depicted in FIG. 11 are simplified for clarity.

Charging the battery packs begins at time 1102. The interval from time 1102 to time 1103 corresponds to step 1001. The charging current provided to the first battery pack at step 1001 is less than the maximum current that the charging circuit is capable of providing. At time 1103, the first battery pack reaches 80% of full charge. The charging circuit stops providing current to the first battery pack. In this example, the charging requirements of the second battery pack differ from the charging requirements of the first battery pack in both voltage and current. The interval from time 1103 to 1104 corresponds to step 1002. The charging circuit provides a current to the second battery pack at a current level less than the maximum current of the charging circuit. At time 1104 the second battery pack reaches 80% of full charge. The charging circuit stops providing current to the second battery pack. The interval from time 1104 to time 1105 corresponds to step 1003. The charging circuit provides current to the first battery pack until the first battery pack reaches full charge at time 1105. Time 1105 to time 1106 corresponds to step 1004. The charging circuit provides current to the second battery pack until the second battery pack reaches full charge at time 1106. At time 1106 both battery packs are at full charge and the charging ends.

During charging steps 1001 through 1004 the charging circuit provides current at less than the maximum current level. For example, while performing step 1001 to charge the first battery pack between times 1102 and 1103, the charging circuit has sufficient current capacity to provide current for step 1002, the first charging step of the second battery pack. However, step 1002 can have voltage requirements that differ from step 1001. In an embodiment, a charging circuit with a single output cannot meet both requirements simultaneously and cannot perform steps 1001 and 1002 simultaneously to charge both the first battery pack and the second battery pack.

Figure 12:
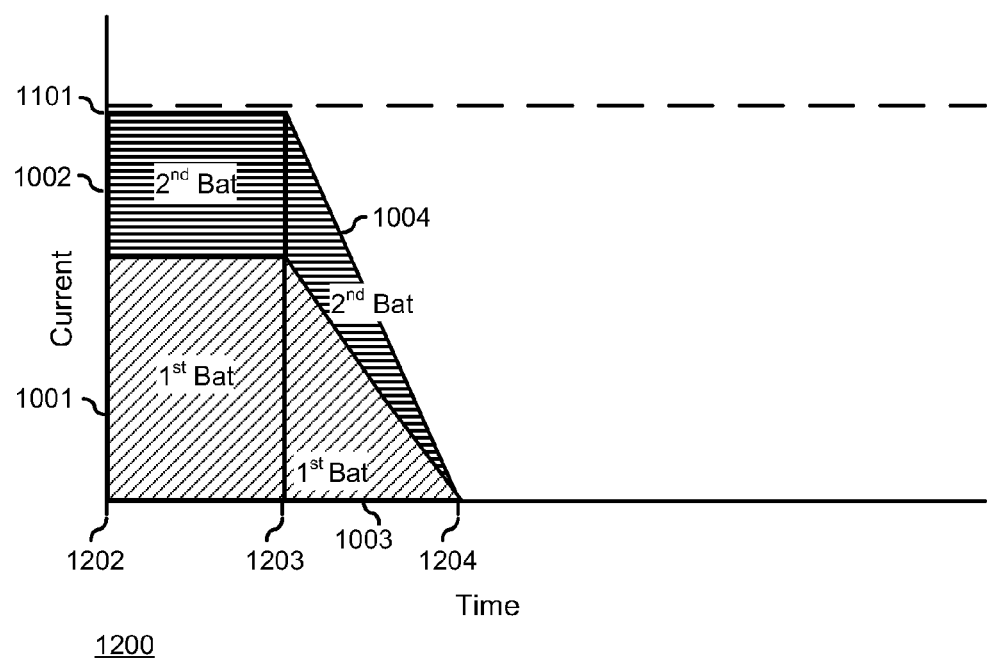

FIG. 12 shows a graph 1200 of the current provided by a DC source to a first adaptive battery pack and to a second adaptive battery pack. The graph illustrates charging adaptive battery packs according to the method shown at FIG. 10. Current level 1101 indicates the maximum current that the DC source is capable of providing. The horizontal axis represents time. The shading of areas indicates the particular battery pack to which current is provided. Charging begins at time 1202. A battery management unit of the first adaptive battery pack draws current from the DC source, converting the voltage as required to charge the first adaptive battery pack to perform step 1001. The total current required by the first adaptive battery pack at step 1001 and by the second adaptive battery pack at step 1002 is less than the maximum current that the DC source is capable of providing, thus the DC source has sufficient capacity to perform steps 1001 and 1002 simultaneously. As the second adaptive battery pack includes a DC-DC converter, it may accept power from the DC source at the same voltage as the first adaptive battery pack. At time 1202, a battery management unit of the second adaptive battery pack draws current from the DC source, converting the voltage as required to charge the second adaptive battery pack to perform step 1002. Those skilled in the art will appreciate that additional adaptive battery packs can be charged, when the DC source has sufficient current capacity, simultaneously with the first and second adaptive battery packs. Thus the charging of adaptive battery packs is limited by the current capability of the DC source. In an embodiment, the DC source is an AC-DC adapter.

The total current required by the first adaptive battery pack at step 1003 and by the second adaptive battery pack at step 1004 is also less than the maximum current that the DC source is capable of providing, thus the DC source has sufficient capacity to perform steps 1003 and 1004 simultaneously. At time 1203, the battery management unit of the first adaptive battery pack draws current from the DC source, converting it to the voltage required to charge the cells of the adaptive first battery pack to 100% charge, performing step 1003. Also at time 1203, the battery management unit of the second adaptive battery pack draws current from the DC source, converting it to the voltage required to charge the battery cells of the second adaptive battery pack to 100% of full charge. At time 1204 the first and second adaptive battery packs reach 100% of full charge. The battery management units of the adaptive battery packs stop drawing current from the DC source. Both adaptive battery packs are at full charge and the charging ends. As more than one charging step is performed simultaneously with adaptive battery packs at FIG. 12, the charging time for adaptive battery packs is less than the charging time for battery packs as discussed with respect to FIG. 11.

The skilled artisan will recognize that the diagram at FIG. 12 is simplified for clarity. Each of the charging steps is illustrated at FIG. 12 as taking the same duration. In an embodiment, the duration of each charging step is different than the durations of other charging steps. For example, the second phase of charging of the first adaptive battery pack can reach 100% before or after time 1204. Charging steps can be performed in any combination that meets the charging requirements of the battery cells and uses no more current than the current limit of the DC source. Those skilled in the art will also appreciate that the current levels of the steps illustrated at FIG. 12 have been simplified. For example, the decrease in current as a function of time during a charging step can be non-linear. Further, charging steps for which a constant current is required by battery cells may not appear as constant current to the DC source due to the DC-DC converter in an adaptive battery pack. As the current provided to battery cells by the DC-DC converter within an adaptive battery pack is held constant the voltage can change, causing the power provided to the battery cells to change. When the input voltage to the DC-DC converter, provided by the DC source, is constant the change in power provided to the battery cells can cause a change in current provided by the DC source.

Figure 13:
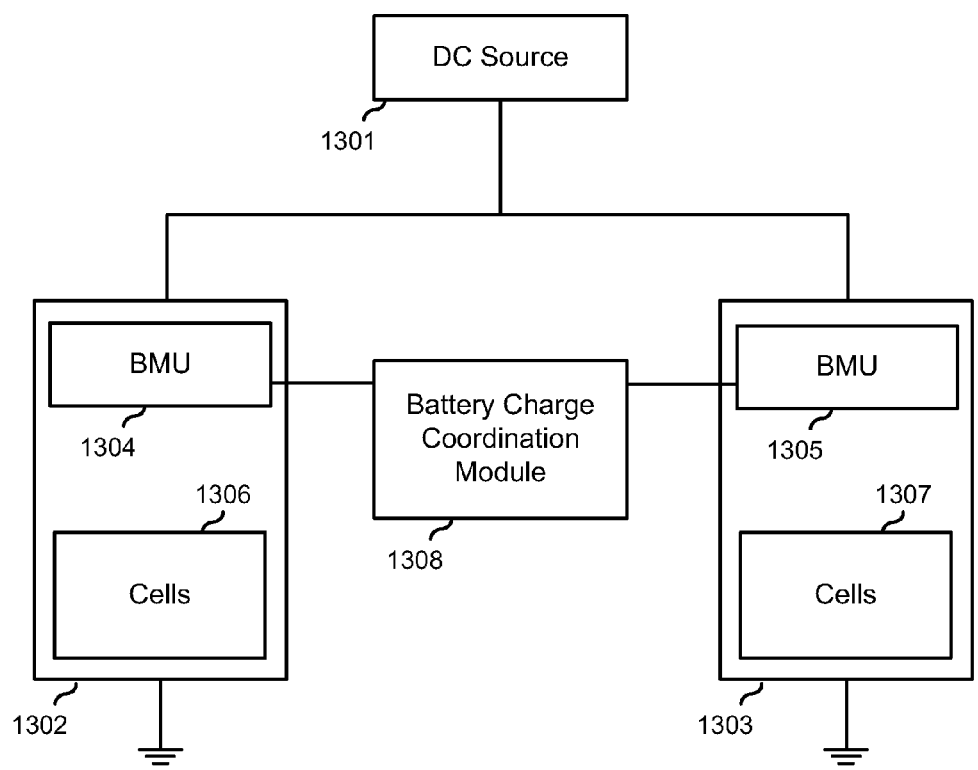
FIG. 13 is a block diagram illustrating an information handling system having two adaptive battery packs according to an embodiment of the present disclosure.

FIG. 13 is a block diagram illustrating an information handling system 1300 having a DC source 1301 and two adaptive battery packs 1302 and 1303. In various embodiments, the DC source 1301 can be any source of DC power suitable for charging battery packs. For example, the DC source 1301 can include an external line powered supply producing a DC voltage from an AC power source. DC source 1301 is coupled to adaptive battery packs 1302 and 1303 to provide current to charge the battery packs. Adaptive battery pack 1302 includes battery management unit 1304 and battery cells 1306. Battery cells 1306 comprise one or more cells having a particular chemistry configured in a particular cell configuration. For example, battery cells 1306 can include four Li-ion cells in a two parallel-two serial (2s-2p) configuration. Battery management unit 1304 converts current provided by DC source 1301 to a voltage and current suitable for charging battery cells 1306. Similarly, battery pack 1303 includes battery management unit 1305 and battery cells 1307. In an embodiment, the chemistry or the cell configuration of battery cells 1307 differs from the chemistry or the cell configuration of battery cells 1306. Thus the charging voltage and the charging current requirements of battery cells 1307 can differ from those of battery cells 1306. Battery management unit 1305 converts the output of DC source 1301 to a voltage suitable for charging battery cells 1307. In an embodiment, battery management units 1304 and 1305 operate simultaneously to charge battery cells 1306 and 1307, respectively, provided that DC source 1301 is capable of providing sufficient current.

In an embodiment, information handling system 1300 coordinates the charging of battery packs. A battery charge coordination module 1308 communicates with battery management units 1304 and 1305 within adaptive battery packs 1302 and 1303, respectively. The battery charge coordination module 1308 instructs battery management units 1304 and 1305 to charge battery cells 1306 and 1307, respectively. In an embodiment, the battery management units 1304 and 1305 send information to the battery charge coordination module 1308, for example the cell configuration or the state of charge of a battery pack. In an embodiment, a battery charge coordination module 1308 communicates with battery management units 1304 and 1305 using a system management bus, for example SMBus.

Figure 14:
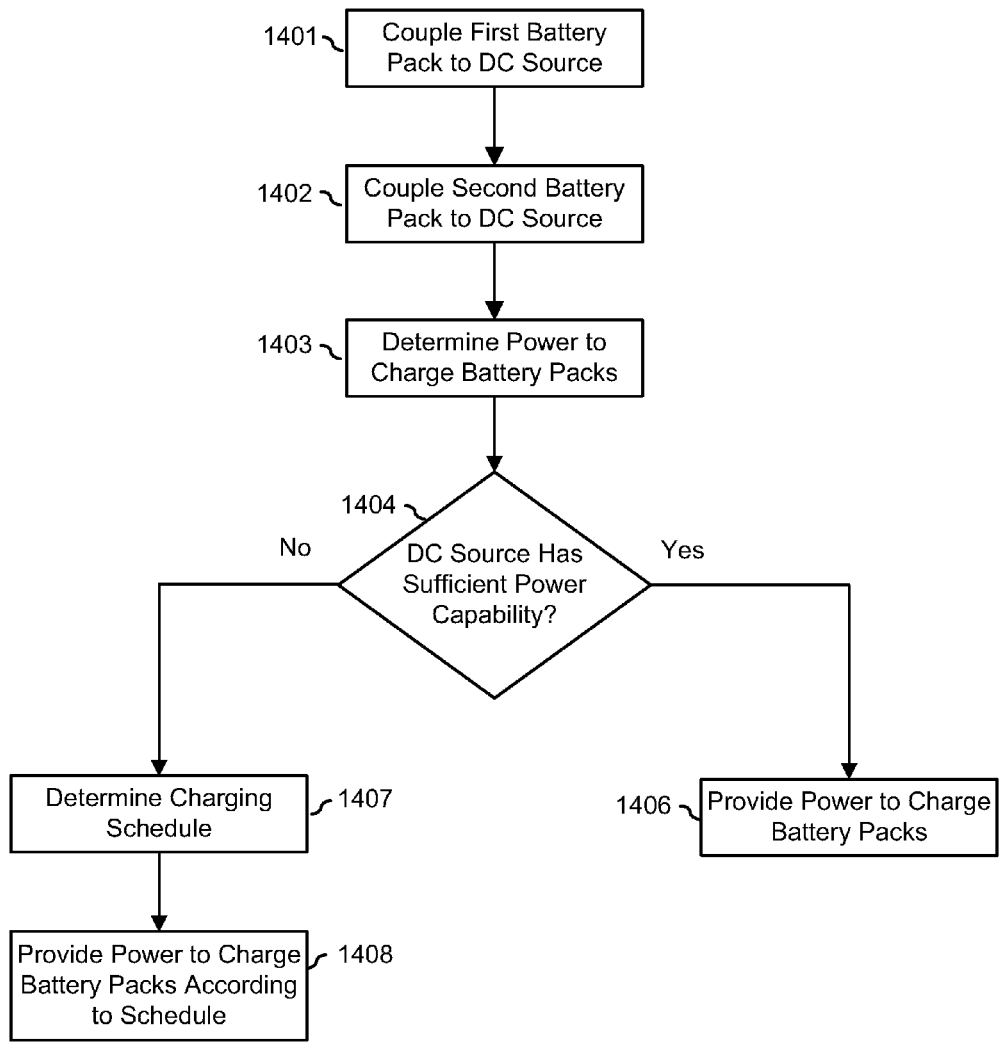
FIG. 14 is a flow diagram of a method for charging two adaptive battery packs according to an embodiment of the present disclosure.

FIG. 14 is a flow diagram 1400 of a method for charging adaptive battery packs having internal voltage conversion. At step 1401a first battery pack is coupled to a DC source. In an embodiment, the first battery pack is a battery pack installed in an information handling system and the DC power source is a removable power supply converting AC power to DC power. In an embodiment, the information handling system has an integrated DC power source and the first battery pack is a removable battery pack. At step 1402 a second battery pack is coupled to the DC source. In an embodiment, the second battery pack is an auxiliary battery pack attached to an information handling system. At step 1403, the power needed to charge the adaptive battery packs is determined. In an embodiment, a power control module 501 as discussed with respect to FIG. 5 can receive power requirement information from an adaptive battery pack. In an embodiment, a power control module can determine power requirements for an adaptive battery pack based on information provided by the adaptive battery pack, for example on battery type information and state of charge information. In an embodiment, the power required to charge adaptive battery packs can be determined by another module within an information handling system. For example, a CPU running a battery management program can determine power requirements.

At step 1404, the capability of the DC source to provide power needed by adaptive battery packs is determined. When the total power needed to charge the adaptive battery packs is less than the maximum power that can be provided by the DC source, flow proceeds to step 1406 and the DC source provides power to charge the adaptive battery packs. When the total power required to charge the adaptive battery packs is more than the total power that the DC source can provide, the method proceeds to step 1407. At step 1407, a charging schedule is determined for the adaptive battery packs. The charging schedule can include a plan for charging the adaptive battery packs using no more than the total power that the DC source can provide. The plan can include one or more steps. Each step indicates one or more adaptive batteries to receive power during the step. In an embodiment, the plan can indicate a time that a step will end. In another embodiment the plan can specify a criterion for ending a step. For example, a step can end when a particular adaptive battery pack reaches 80% of full charge. In an embodiment, a charging schedule allows one adaptive battery pack at a time to be charged. In an embodiment, a charging schedule allows more than one adaptive battery pack to be charged simultaneously. In an embodiment, a charging schedule can include power levels to be provided to each adaptive battery pack at each step in the schedule. In an embodiment, a step in a schedule can indicate a power level provided to an adaptive battery pack that is less than the power level for the adaptive battery pack determined in step 1403. In an embodiment, a power control module controls the power level provided to each adaptive battery pack. In an embodiment, a power control module instructs an adaptive battery pack to limit the power consumed by the adaptive battery pack during a charging step according to the charging schedule. In an embodiment, a charging schedule includes a single step and a new charging schedule is determined at the completion of the step. In an embodiment, a step of a charging schedule can be terminated in response to the occurrence of an external event. External events can be the removal of a DC source from the information handling system, the removal of a battery pack from the information handling system, a command to shut down the information handling system, an alert from a battery pack as described with respect to FIG. 15, a combination of events, and the like.

At step 1406, the DC source provides power to both battery packs simultaneously. In an embodiment, the DC source provides power to the first battery pack and the second battery pack on a single circuit, so that both battery packs receive power at the same voltage. In another embodiment, the DC source provides power on a first circuit to the first battery pack and on a second circuit to the second battery pack. The voltage of the charging power provided by the DC source is converted to a voltage required to charge cells of the first battery pack. In an embodiment, the voltage required by the first battery pack depends on the state of charge of the first battery pack. In an embodiment, a battery management unit in the first battery pack includes a DC-DC converter and the voltage conversion is performed by the battery management unit. In an embodiment, the voltage conversion performed by the battery management unit increases or decreases the voltage of the charging current in order to meet the charging voltage requirement of cells of the first battery pack. In an embodiment, the battery management unit only decreases the voltage. In an embodiment, the battery management unit only increases the voltage. The voltage of the charging power provided by the DC source is converted to a voltage required to charge the second battery pack in a manner similar to the voltage conversion performed for the first battery pack.

The foregoing description describes an example system with two adaptive battery packs and a particular method of charging. Those skilled in the art will appreciate that the techniques disclosed herein can be extended to three or more battery packs and to other charging methods. Other methods to minimize the charge time for a plurality of adaptive battery packs based on a maximum current provided by a DC source, the capacity of the adaptive battery packs, and the states of charge of the adaptive battery packs may be used with the present disclosure.

Figure 15:
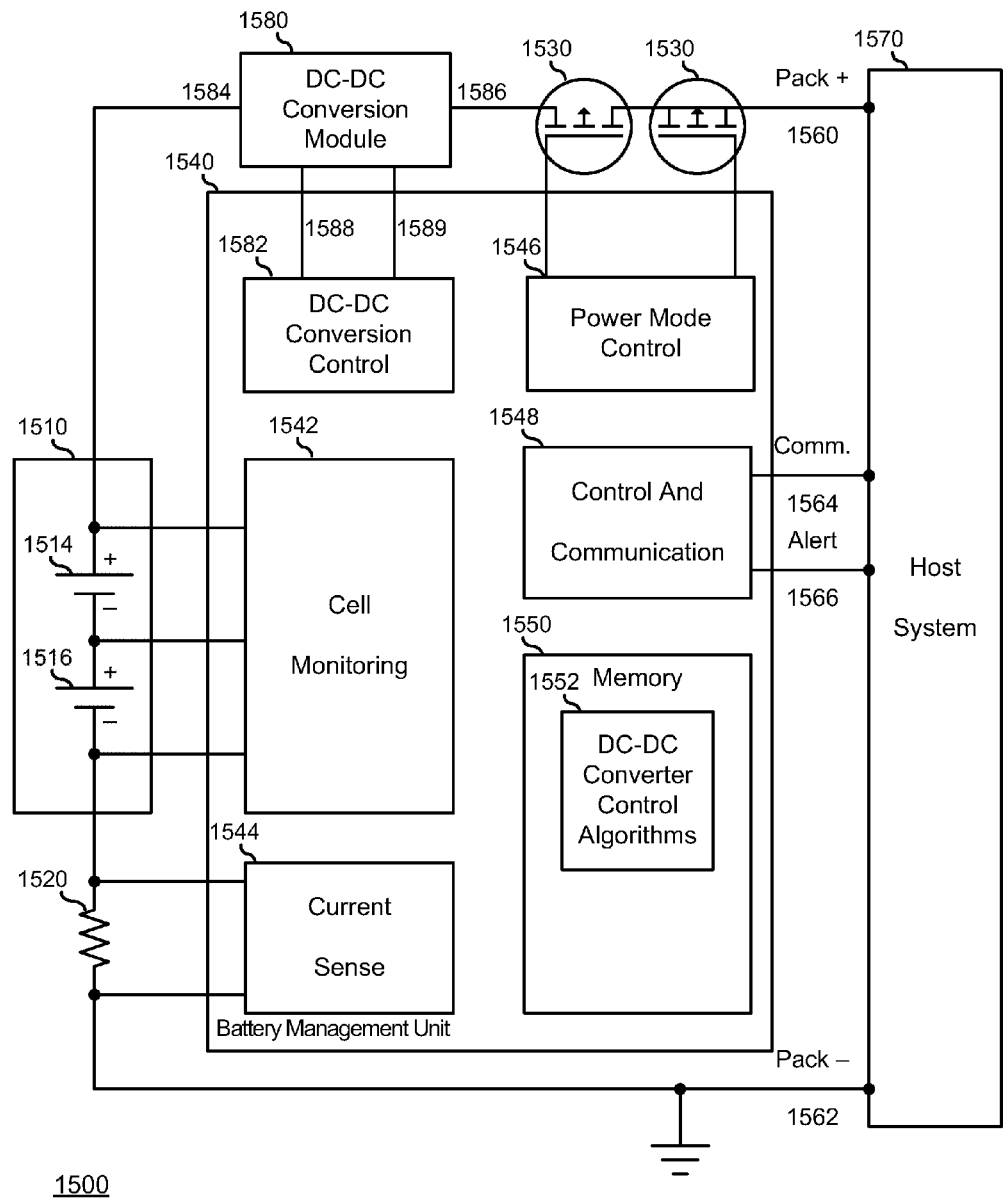
FIG. 15 is a diagram of an adaptive battery pack according to an embodiment of the present disclosure.

FIG. 15 illustrates a battery pack 1500 for powering a host system 1570 and including a battery cell stack 1510, a current sense resistor 1520, power FETs 1530, DC-DC conversion module 1580 and a battery management unit (BMU) 1540. Battery cell stack 1510 includes cell blocks 1514 and 1516. Cell blocks 1514 and 1516 represent one or more battery cells that are arranged together to provide a single voltage level to battery cell stack 1510. For example cell blocks 1514 and 1516 can each include individual battery cells arranged in a serial configuration to provide a larger voltage level, in a parallel configuration to provide a larger current capability and a greater capacity, or in a combination thereof. Battery cell stack 1510 is illustrated as having two cell blocks 1514 and 1516, but this is not necessarily so, and battery cell stack 1510 can include more or less than two cell blocks, as needed or desired.

Current sense resistor 1520 is a low resistance resistor that provides a small voltage drop that is measurable by BMU 1540 to determine the amount of current being provided by battery cell stack 1510 when the battery cell stack is discharging, and the amount of current being provided to the battery cell stack when the battery cell stack is charging. In a particular embodiment, current sense resistor 1520 is provided in conjunction with a fuse to protect battery cell stack 1510 and host system 1570 from an over current condition. An example of current sense resistor 1520 includes a resistor with a resistance of between 5 and 20 milli-ohms (mΩ), or a resistor with another resistance, as needed or desired. Power FETs 1530 operate as switches to connect battery cell stack 1510 to a load when battery system 1500 is in a discharge mode, and to a power source when the battery system is in a charge mode. Battery system 1500 provides a battery voltage to host system 1570 between a battery pack positive terminal 1560 and a battery pack negative terminal 1562, where the negative terminal is typically associated with a circuit ground potential. For example, in the discharge mode battery system 1500 provides battery power at positive terminal 1560 and a return at negative terminal 1562, and in charge mode the battery system receives power at the positive terminal and a return at the negative terminal.

BMU 1540 includes a cell block monitoring module 1542, current sense module 1544, a power mode control module 1546, a control and communication module 1548, a DC-DC conversion control module 1582 and a memory module 1550. BMU 1540 operates to manage the operation of battery cell stack 1510, to control charging and discharging of the battery cell stack, to protect the battery cell stack, to monitor and report the state of cell blocks 1514 and 1516, to balance the cell blocks, and to communicate status and control information related to the operation of the battery system. Cell block monitoring module 1542 performs cell block balancing, managing the selective discharging of one or more of cell blocks 1514 and 1516 in order to maximize the capacity of battery cell stack 1510 and make more of the energy stored in the cell blocks available for use, and to increase the lifespan of the battery cell stack.

Control and communication module 1548 operates to provide a communication channel between BMU 1540 and host system 1570 that is connected to battery system 1500 to provide status and control information to the host system and to receive control parameters from the host system. An illustrative example of host system 1570 includes a laptop computer, a cell phone, another mobile device, a desktop computer, a battery backup system, an uninterruptible power supply, another battery operated device or system, or a combination thereof. In an embodiment, the host system includes a power control module, as discussed with respect to FIG. 5, coupled to control and communication module 1548. Control and communication module 1548 includes a communication port 1564 and an alert signal output 1566. In a particular embodiment, communication port 1564 operates in accordance with a System Management Bus (SMBus) protocol for sending and receiving system management data. Alert signal 1566 represents one or more signals provided from control and communication module 1548 to host system 1570 to inform the host system of various alert conditions within battery system 1500. In a particular embodiment, the signals are discrete logical signals that each represent a different alert condition. In another embodiment, the signals are encoded on a group of logic signals. In yet another embodiment, the signals are not discrete signals, but represent specific fault condition information that is communicated from BMU 1540 to host system 1570 over communication port 1564. An example of an alert condition includes battery cell stack charge full, battery cell stack charge empty, battery cell stack charging, battery cell stack discharging, battery cell stack over temperature, cell block over charge, cell block under charge, cell block balancing, cell block short, over current, another battery system status, or a combination thereof.

Memory module 1550 represents a data storage medium of BMU 1540 that stores operating programs and data for the BMU and includes a DC-DC converter control algorithms 1552. In a particular embodiment, memory module 1550 represents a non-volatile random access memory (NVRAM) such as a flash memory that retains the contents of the storage medium when the power is removed from the memory module. DC-DC converter control algorithms 1552 represents the operating program used by BMU 1540 to perform the functions and operations as described herein. For example, DC-DC converter control algorithms 1552 can include algorithms for selecting a voltage appropriate to charge cell stack 1510.

DC-DC conversion module 1580 includes cell stack terminal 1584 and host system terminal 1586. DC-DC conversion module 1580 operates to convert a voltage provided by cell stack 1510 at cell stack terminal 1584 to a voltage at host system terminal 1586 appropriate to host system 1570 when the battery pack is discharging. When the battery pack is charging, DC-DC conversion module 1580 operates to convert a voltage provided by host system 1570 at host system terminal 1586 to a voltage at cell stack terminal 1584 appropriate for charging cell stack 1510. DC-DC conversion module 1580 is controlled by DC-DC conversion control 1582. DC-DC conversion control 1582 indicates the direction of conversion to DC-DC conversion module 1580 with direction control 1588, and indicates the desired output voltage with voltage control 1589.

Figure 16:
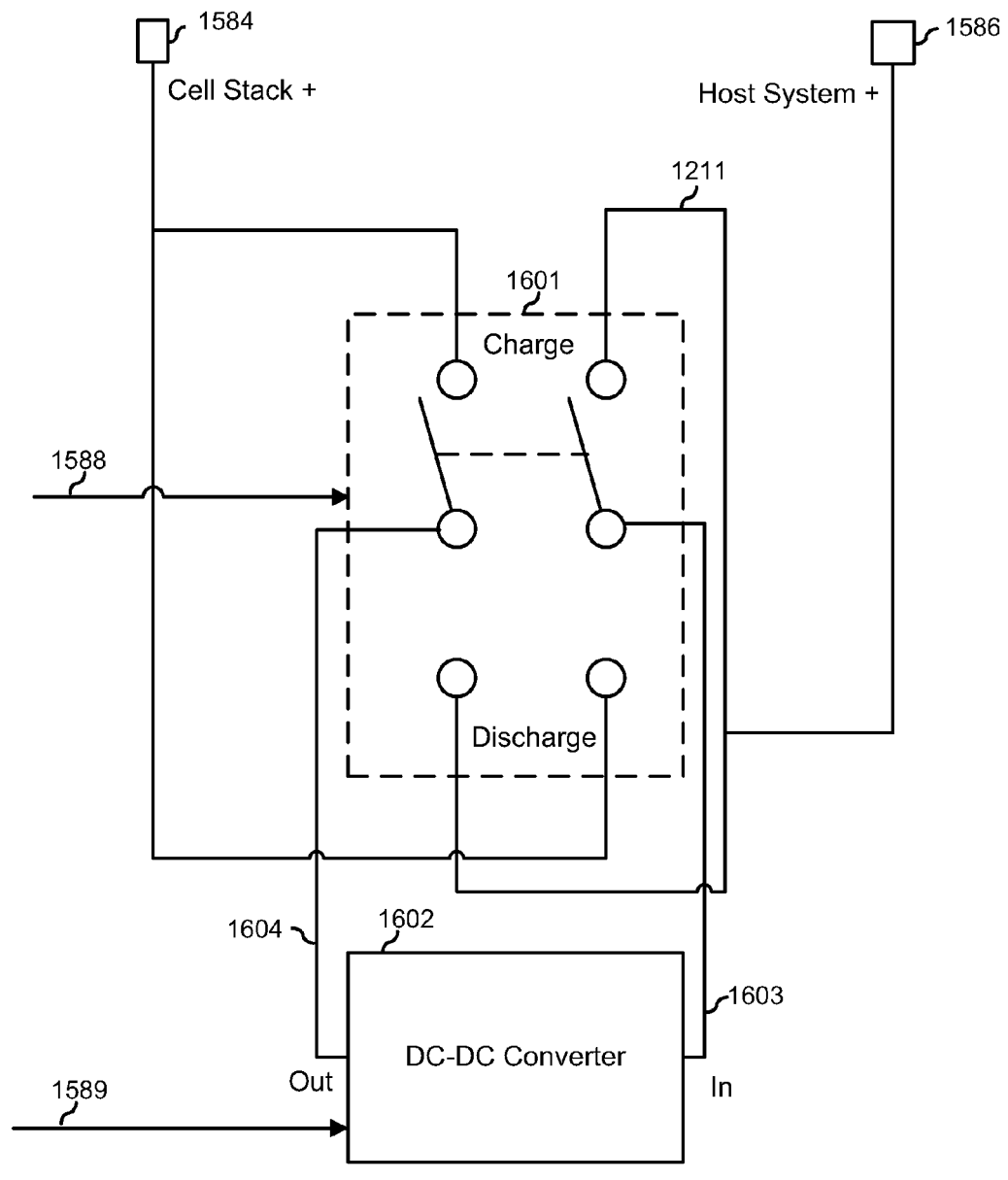
FIG. 16 is a block diagram of a DC-DC conversion module of an adaptive battery pack according to an embodiment of the present disclosure.

FIG. 16 shows a combination block and schematic diagram of DC-DC conversion module 1580. DC-DC conversion module 1580 includes switch 1601 and DC-DC converter 1602. DC-DC converter 1602 has an input 1603 and an output 1604. In an embodiment, DC-DC converter 1602 is a buck-boost converter. The voltage conversion performed by DC-DC converter 1602 is controlled by voltage control 1589. Voltage control 1589 specifies an output voltage of DC-DC converter 1602. In an embodiment, voltage control 1589 specifies either an increase or a decrease in voltage as well as the magnitude of the voltage conversion. In an embodiment, voltage control 1589 specifies an output voltage of DC-DC converter 1602. Switch 1601 is a double-pole double-throw switch. The state of switch 1601 is controlled by direction control 1588. Direction control 1588 specifies the position of switch 1601 to be one of a discharge position or a charge position. In an embodiment, switch 1601 is implemented using transistor switches. In an embodiment, switch 1601 is implemented with mechanical switches.

In a discharge mode of operation, direction control 1588 places switch 1601 in the discharge position. In the discharge position, switch 1601 couples battery cell terminal 1584 to the input 1603 of DC-DC-converter 1602 and couples the host system terminal 1586 to the output 1604 of DC-DC converter 1602. Voltage control 1589 instructs the DC-DC converter 1602 to perform a voltage conversion.

In a charge mode of operation, direction control 1588 places switch 1601 in the charge position. In the charge position, switch 1601 couples battery cell terminal 1584 to the output 1604 of DC-DC-converter 1602 and couples the host system terminal 1586 to the input 1603 of DC-DC converter 1602. Voltage control 1589 instructs the DC-DC converter 1602 to perform a voltage conversion.

Drawing power from more than one battery pack simultaneously to power an information handling system as described herein makes use of one or more DC-DC power converters. In embodiments of the present disclosure, the DC-DC converters are included in adaptive battery packs. In an embodiment, the ability for an information handling system to operate in a high performance mode depends on the voltage supplied by a battery pack. A DC-DC converter in the adaptive battery pack increases the output voltage of battery cells in the adaptive battery pack allowing the information handling system to operate in the high performance mode. In an embodiment, an adaptive battery pack uses a DC-DC converter to adjust an output voltage to match the voltage supplied by another battery pack, allowing both battery packs to provide current to a load. In an embodiment, an adaptive battery pack uses a DC-DC converter to increase the voltage provided by battery cells to provide power to an information handling system in response to the information handling system operating in a high performance mode. In an embodiment, output voltages of two adaptive battery packs are set to a particular voltage level and provide power simultaneously to an information handling system. In an embodiment, the output voltages of two adaptive battery packs are set to a particular voltage level allowing a particular mode of operation of an information handling system. Charging more than one battery pack simultaneously as described herein also uses DC-DC power converters included in adaptive battery packs. In an embodiment, a single DC-DC power converter included in an adaptive battery pack converts the output voltage of the battery pack for the purpose of powering an information handling system and converts the input voltage to the battery pack for the purpose of charging the battery cells.

Figure 17:
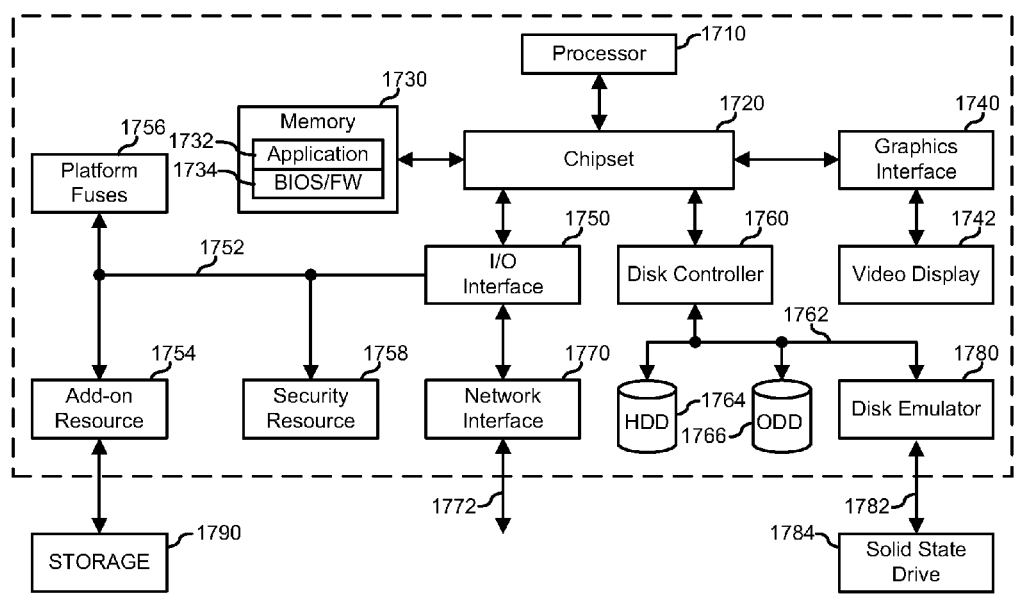
FIG. 17 is a diagram of an information handling system according to an embodiment of the present disclosure.

FIG. 17 is a block diagram illustrating an embodiment of an information handling system 1700, including a processor 1710, a chipset 1720, a memory 1730, a graphics interface 1740, an input/output (I/O) interface 1750, a disk controller 1760, a network interface 1770, and a disk emulator 1780. In a particular embodiment, information handling system 1700 is used to carry out one or more of the methods described herein. In another embodiment, one or more of the systems described herein are implemented in the form of information handling system 1700.

Chipset 1720 is connected to and supports processor 1710, allowing the processor to execute machine-executable code. In a particular embodiment, information handling system 1700 includes one or more additional processors, and chipset 1720 supports the multiple processors, allowing for simultaneous processing by each of the processors and permitting the exchange of information among the processors and the other elements of the information handling system. Chipset 1720 can be connected to processor 1710 via a unique channel, or via a bus that shares information among the processor, the chipset, and other elements of information handling system 1700.

Memory 1730 is connected to chipset 1720. Memory 1730 and chipset 1720 can be connected via a unique channel, or via a bus that shares information among the chipset, the memory, and other elements of information handling system 1700. In another embodiment (not illustrated), processor 1710 is connected to memory 1730 via a unique channel. In another embodiment (not illustrated), information handling system 1700 includes separate memory dedicated to each of the one or more additional processors. A non-limiting example of memory 1730 includes static random access memory (SRAM), dynamic random access memory (DRAM), non-volatile random access memory (NVRAM), read only memory (ROM), flash memory, another type of memory, or any combination thereof.

Graphics interface 1740 is connected to chipset 1720. Graphics interface 1740 and chipset 1720 can be connected via a unique channel, or via a bus that shares information among the chipset, the graphics interface, and other elements of information handling system 1700. Graphics interface 1740 is connected to a video display 1742. Other graphics interfaces (not illustrated) can also be used in addition to graphics interface 1740 as needed or desired. Video display 1742 includes one or more types of video displays, such as a flat panel display, another type of display device, or any combination thereof.

I/O interface 1750 is connected to chipset 1720. I/O interface 1750 and chipset 1720 can be connected via a unique channel, or via a bus that shares information among the chipset, the I/O interface, and other elements of information handling system 1700. Other I/O interfaces (not illustrated) can also be used in addition to I/O interface 1750 as needed or desired. I/O interface 1750 is connected via an I/O interface 1752 to one or more add-on resources 1754. Add-on resource 1754 is connected to a storage system 1790, and can also include another data storage system, a graphics interface, a network interface card (NIC), a sound/video processing card, another suitable add-on resource or any combination thereof. I/O interface 1750 is also connected via I/O interface 1752 to one or more platform fuses 1756 and to a security resource 1758. Platform fuses 1756 function to set or modify the functionality of information handling system 1700 in hardware. Security resource 1758 provides a secure cryptographic functionality and includes secure storage of cryptographic keys. A non-limiting example of security resource 1758 includes a Unified Security Hub (USH), a Trusted Platform Module (TPM), a General Purpose Encryption (GPE) engine, another security resource, or a combination thereof.

Disk controller 1760 is connected to chipset 1720. Disk controller 1760 and chipset 1720 can be connected via a unique channel, or via a bus that shares information among the chipset, the disk controller, and other elements of information handling system 1700. Other disk controllers (not illustrated) can also be used in addition to disk controller 1760 as needed or desired. Disk controller 1760 includes a disk interface 1762. Disk controller 1760 is connected to one or more disk drives via disk interface 1762. Such disk drives include a hard disk drive (HDD) 1764, and an optical disk drive (ODD) 1766, and can include one or more disk drive as needed or desired. ODD 1766 can include a Read/Write Compact Disk (R/W-CD), a Read/Write Digital Video Disk (R/W-DVD), a Read/Write mini Digital Video Disk (R/W mini-DVD, another type of optical disk drive, or any combination thereof. Additionally, disk controller 1760 is connected to disk emulator 1780. Disk emulator 1780 permits a solid-state drive 1784 to be coupled to information handling system 1700 via an external interface 1782. External interface 1782 can include industry standard busses such as USB or IEEE 1794 (Firewire) or proprietary busses, or any combination thereof. Alternatively, solid-state drive 1784 can be disposed within information handling system 1700.

Network interface device 1770 is connected to I/O interface 1750. Network interface 1770 and I/O interface 1750 can be coupled via a unique channel, or via a bus that shares information among the I/O interface, the network interface, and other elements of information handling system 1700. Other network interfaces (not illustrated) can also be used in addition to network interface 1770 as needed or desired. Network interface 1770 can be a network interface card (NIC) disposed within information handling system 1700, on a main circuit board such as a baseboard, a motherboard, or any combination thereof, integrated onto another component such as chipset 1720, in another suitable location, or any combination thereof. Network interface 1770 includes a network channel 1772 that provide interfaces between information handling system 1700 and other devices (not illustrated) that are external to information handling system 1700. Network interface 1770 can also include additional network channels (not illustrated).

Information handling system 1700 includes one or more application programs 1732, and Basic Input/Output System and Firmware (BIOS/FW) code 1734. BIOS/FW code 1734 functions to initialize information handling system 1700 on power up, to launch an operating system, and to manage input and output interactions between the operating system and the other elements of information handling system 1700. In a particular embodiment, application programs 1732 and BIOS/FW code 1734 reside in memory 1730, and include machine-executable code that is executed by processor 1710 to perform various functions of information handling system 1700. In another embodiment (not illustrated), application programs and BIOS/FW code reside in another storage medium of information handling system 1700. For example, application programs and BIOS/FW code can reside in HDD 1764, in a ROM (not illustrated) associated with information handling system 1700, in an option-ROM (not illustrated) associated with various devices of information handling system 1700, in storage system 1790, in a storage system (not illustrated) associated with network channel 1772, in another storage medium of information handling system 1700, or a combination thereof. Application programs 1732 and BIOS/FW code 1734 can each be implemented as single programs, or as separate programs carrying out the various features as described herein.

In the embodiments described herein, an information handling system includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system can be a personal computer, a consumer electronic device, a network server or storage device, a switch router, wireless router, or other network communication device, a network connected device (cellular telephone, tablet device, etc.), or any other suitable device, and can vary in size, shape, performance, price, and functionality. The information handling system can include memory (volatile (e.g. random-access memory, etc.), non-volatile (read-only memory, flash memory etc.) or any combination thereof), one or more processing resources, such as a central processing unit (CPU), a graphics processing unit (GPU), hardware or software control logic, or any combination thereof. Additional components of the information handling system can include one or more storage devices, one or more communications ports for communicating with external devices, as well as, various input and output (I/O) devices, such as a keyboard, a mouse, a video/graphic display, or any combination thereof. The information handling system can also include one or more buses operable to transmit communications between the various hardware components. Portions of an information handling system may themselves be considered information handling systems.

When referred to as a "device," a "module," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device). The device or module can include software, including firmware embedded at a device, such as a Pentium class or PowerPC™ brand processor, or other such device, or software capable of operating a relevant environment of the information handling system. The device or module can also include a combination of the foregoing examples of hardware or software. Note that an information handling system can include an integrated circuit or a board-level product having portions thereof that can also be any combination of hardware and software.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. An information handling system, comprising:
   a voltage control module;
   a first battery pack coupled to the voltage control module to receive a first voltage control signal from the voltage control module, the first battery pack including a first adjustable DC-DC voltage converter and a first battery management unit, the first battery management unit including the first adjustable DC-DC voltage converter, wherein a first output voltage of the first battery pack is set by the voltage control module by providing the first voltage control signal to the first adjustable DC-DC voltage converter;
   a second battery pack coupled to the voltage control module to receive a second voltage control signal from the voltage control module, the second battery pack including a second adjustable DC-DC voltage converter and a second battery management unit, the second battery management unit including the second adjustable DC-DC voltage converter, wherein a second output voltage of the second battery pack is set by the voltage control module by providing the second voltage control signal to the second adjustable DC-DC voltage converter;
   a first load; and
   the voltage control module is operable to:
      determine a first voltage level;
      set the first output voltage to the first voltage level;
      direct a first power from the first battery pack to the first load;
      determine a second voltage level;
      set the second output voltage to the second voltage level; and
      direct a second power from the second battery pack to the first load, wherein the first power is based on the first output voltage, the second power is based on the second output voltage, and the first and second powers are provided to the first load simultaneously to provide a particular voltage to the first load, wherein the particular voltage is a sum of the first output voltage and the second output voltage.

2. The information handling system of claim 1, wherein: the first voltage level is equal to the second voltage level.

3. The information handling system of claim 1, wherein: the first voltage level is determined based on an operating mode of the first load.

4. The information handling system of claim 1, wherein: the voltage control module evaluates a system performance parameter of the information handling system; and the first voltage level is determined based on the system performance parameter.

5. The information handling system of claim 1, further comprising a DC power source, wherein the voltage control module is further operable to:
   direct power from the DC power source to the first battery pack; and
   direct power from the DC power source to the first load, wherein power is directed to the first battery pack and to the first load simultaneously.

6. The information handling system of claim 1, further comprising a DC power source; wherein the voltage control module is further operable to:
   direct power from the DC power source to the first battery pack; and
   direct power from the DC power source to the second battery pack, wherein power is directed to the first battery pack and to the second battery pack simultaneously.

7. An information handling system comprising:
   a voltage control module;
   a first battery pack, including:
      a first battery management unit including a first DC-DC converter circuit, wherein the first battery management unit is coupled to the voltage control module to receive a first control signal from the voltage control module;
      a first cell configuration;
      a first control input terminal; and
      a first power terminal coupled to the first DC-DC converter circuit, wherein a voltage provided by the first battery pack at the first power terminal is controlled by a first signal from the voltage control module received at the first control input terminal;
   a second battery pack, including:
      a second battery management unit including a second DC-DC converter circuit, wherein the second battery management unit is coupled to the voltage control module to receive a second control signal from the voltage control module;

a second cell configuration;

a second control input terminal; and a second power terminal coupled to the second DC-DC converter circuit, wherein a voltage provided by the second battery pack at the second power terminal is controlled by a second signal from the voltage control module received at the second control input terminal;

an electrical load coupled to the first power terminal and to the second power terminal, wherein the first signal and the second signal are set such that the first battery pack and the second battery pack together provide a voltage to the electrical load simultaneously, the first signal controls a portion of the voltage provided by the first battery pack, and the second signal controls a portion of the voltage provided by the second battery pack.

8. The information handling system of claim 7, wherein:

the first DC-DC converter circuit reduces a voltage of power provided by the first cell configuration in response to the first signal indicating a voltage less than the voltage provided by the first cell configuration; and the first DC-DC converter circuit increases the voltage of power provided by the first cell configuration in response to the first signal indicating a voltage greater than the voltage provided by the first cell configuration.

9. An information handling system comprising:

a battery charge coordination module;

a first battery pack including:

a first battery management unit having a first DC-DC converter circuit, wherein the first battery management unit is coupled to the battery charge coordination module to receive a first charge instruction from the battery charge coordination module;

a first set of battery cells having a first cell configuration; and a second battery pack including:

a second battery management unit having a second DC-DC converter circuit, wherein the second battery management unit is coupled to the battery charge coordination module to receive a second charge instruction from the battery charge coordination module; and a second set of battery cells having a second cell configuration;

wherein a DC power source provides power to the first battery pack and the second battery pack simultaneously at a source voltage, and the second DC-DC converter circuit converts the source voltage to a second charge voltage to charge the second set of battery cells at the second charge voltage.

\* \* \* \* \*